United States Patent
Mochizuki et al.

(10) Patent No.: US 12,456,994 B2
(45) Date of Patent: Oct. 28, 2025

(54) SIGNAL PROCESSING DEVICE, SIGNAL PROCESSING METHOD, AND NON-TRANSITORY COMPUTER READABLE MEDIUM

(71) Applicant: NEC Corporation, Tokyo (JP)

(72) Inventors: Takuji Mochizuki, Tokyo (JP); Kazuhiro Ishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 324 days.

(21) Appl. No.: 18/268,381

(22) PCT Filed: May 25, 2021

(86) PCT No.: PCT/JP2021/019815
§ 371 (c)(1),
(2) Date: Jun. 20, 2023

(87) PCT Pub. No.: WO2022/137593
PCT Pub. Date: Jun. 30, 2022

(65) Prior Publication Data
US 2024/0072832 A1   Feb. 29, 2024

(30) Foreign Application Priority Data
Dec. 25, 2020 (JP) .................................. 2020-217508

(51) Int. Cl.
*H04B 1/04* (2006.01)

(52) U.S. Cl.
CPC ... *H04B 1/0475* (2013.01); *H04B 2001/0408* (2013.01)

(58) Field of Classification Search
CPC .......... H04B 1/04; H04B 1/10; H04B 1/0475; H04B 2001/0408
See application file for complete search history.

(56) References Cited

U.S. PATENT DOCUMENTS

| | | | |
|---|---|---|---|
| 6,172,560 B1 * | 1/2001 | Yamashita | H03F 1/3235 330/151 |
| 6,907,025 B2 * | 6/2005 | Demir | H04W 52/52 370/342 |

(Continued)

FOREIGN PATENT DOCUMENTS

| | | |
|---|---|---|
| JP | H09-102759 A | 4/1997 |
| JP | 2010-283779 A | 12/2010 |

(Continued)

OTHER PUBLICATIONS

Ashida Junya, "Distortion compensation circuit, distortion compensation method, and transmitter", 11 pages (Year: 2017).*

(Continued)

*Primary Examiner* — Hai V Nguyen
(74) *Attorney, Agent, or Firm* — Sughrue Mion, PLLC

(57) ABSTRACT

A signal processing device according to an example embodiment includes: a distortion compensation circuit configured to execute distortion compensation processing of compensating for nonlinear distortion on an input signal, and output a signal subjected to the distortion compensation processing; an amplifier configured to amplify the signal output from the distortion compensation circuit and output the amplified signal as a communication signal; and a signal output circuit configured to output an adjustment signal for adjusting the distortion compensation processing to the distortion compensation circuit as the input signal at a timing at which the communication signal is not output, the adjustment signal having a frequency band that covers a frequency band of the communication signal.

10 Claims, 21 Drawing Sheets

(56) References Cited

U.S. PATENT DOCUMENTS

| | | | | |
|---|---|---|---|---|
| 7,310,381 B2* | 12/2007 | Dinur | H04L 27/368 | 375/297 |
| 7,463,697 B2* | 12/2008 | Maltsev | H04L 25/49 | 375/295 |
| 7,531,922 B1* | 5/2009 | Olson | H05B 41/2828 | 307/157 |
| 7,596,125 B2* | 9/2009 | Alpaslan | H04W 52/52 | 370/342 |
| 7,839,951 B2* | 11/2010 | Cai | H04L 27/2623 | 375/350 |
| 8,086,194 B2* | 12/2011 | Koga | H04B 14/023 | 375/257 |
| 8,320,497 B2* | 11/2012 | Behzad | H04L 27/3411 | 375/296 |
| 8,867,661 B2* | 10/2014 | Behzad | H04B 1/0475 | 375/296 |
| 9,769,003 B2* | 9/2017 | Bogdan | H04L 25/0398 | |
| 10,075,204 B2* | 9/2018 | Bogdan | H03H 17/04 | |
| 10,623,049 B2* | 4/2020 | Zhang | H03F 3/68 | |
| 10,985,951 B2* | 4/2021 | Li | H04L 25/03165 | |
| 11,451,419 B2* | 9/2022 | Li | H04B 1/16 | |
| 11,456,762 B2* | 9/2022 | Mochizuki | H04B 1/04 | |
| 11,664,836 B2* | 5/2023 | Huang | H04B 1/12 | 370/295 |
| 11,855,813 B2* | 12/2023 | Li | H03F 3/20 | |
| 11,863,210 B2* | 1/2024 | Megretski | H03F 3/24 | |
| 12,003,350 B1* | 6/2024 | McCormick | H04B 7/18513 | |
| 12,273,221 B2* | 4/2025 | Li | G06N 3/08 | |
| 2004/0243258 A1* | 12/2004 | Shattil | H04L 27/265 | 700/55 |
| 2004/0252785 A1* | 12/2004 | Demir | H03F 1/3294 | 375/297 |
| 2009/0059782 A1* | 3/2009 | Cole | H04L 25/0272 | 375/345 |
| 2009/0153132 A1* | 6/2009 | Tufillaro | H03F 1/3247 | 324/76.21 |
| 2009/0207896 A1* | 8/2009 | Behzad | H04L 1/0035 | 375/221 |
| 2009/0207936 A1* | 8/2009 | Behzad | H04L 25/03 | 375/296 |
| 2009/0310705 A1* | 12/2009 | Fujimoto | H03F 1/3241 | 375/296 |
| 2010/0226446 A1* | 9/2010 | Koga | H04L 5/0046 | 375/257 |
| 2013/0230083 A1* | 9/2013 | Behzad | H04L 1/0035 | 375/296 |
| 2015/0061761 A1* | 3/2015 | Wills | H03F 1/0222 | 330/127 |
| 2015/0312078 A1* | 10/2015 | Bogdan | H04L 7/0087 | 375/226 |
| 2019/0280730 A1* | 9/2019 | Zhang | H04B 1/0458 | |
| 2021/0391879 A1* | 12/2021 | Mochizuki | H04B 1/04 | |
| 2023/0388171 A1* | 11/2023 | Bogdan | H03H 17/0251 | |

FOREIGN PATENT DOCUMENTS

| | | | | |
|---|---|---|---|---|
| JP | 2012-231270 A | | 11/2012 | |
| JP | 2012-244553 A | | 12/2012 | |
| JP | 2015-511802 A | | 4/2015 | |
| JP | 2017220744 A | * | 12/2017 | ............... H04B 1/10 |
| JP | 2019-536381 A | | 12/2019 | |
| JP | 2020-136772 A | | 8/2020 | |
| WO | 2008/111471 A1 | | 9/2008 | |
| WO | 2020/144889 A1 | | 7/2020 | |

OTHER PUBLICATIONS

International Search Report for PCT Application No. PCT/JP2021/019815, mailed on Jul. 20, 2021.

JP Office Action for Japanese Patent Application No. 2022-571016, mailed on Sep. 3, 2024 with English Translation.

JP Office Action for Japanese Patent Application No. 2022-571016, mailed on May 21, 2024 with English Translation.

* cited by examiner

SIGNAL PROCESSING DEVICE, SIGNAL PROCESSING METHOD, AND NON-TRANSITORY COMPUTER READABLE MEDIUM

This application is a National Stage Entry of PCT/JP2021/019815 filed on May 25, 2021, which claims priority from Japanese Patent Application 2020-217508 filed on Dec. 25, 2020, the contents of all of which are incorporated herein by reference, in their entirety.

TECHNICAL FIELD

The present invention relates to a signal processing device, a signal processing method, and a non-transitory computer readable medium.

BACKGROUND ART

A technology related to wireless communication such as 5th generation (5G) is in progress. In this technical field, compensating for distortion present in a signal is important to ensure accurate delivery of a signal content.

For example, Patent Literature 1 discloses an antenna device including a distortion compensation unit that compensates for distortion caused by a plurality of amplifiers. A detection unit of the antenna device detects, for example, amplitude modulation (AM)-AM distortion or AM-phase modulation (PM) distortion as a distortion characteristic of a power amplifier. The distortion compensation unit performs distortion compensation for the plurality of amplifiers based on the detection result.

CITATION LIST

Patent Literature

Patent Literature 1: Japanese Unexamined Patent Application Publication No. 2020-136772

SUMMARY OF INVENTION

Technical Problem

In a wireless communication system, a digital pre-distortion (DPD) compensation unit is provided upstream of an amplifier to suppress distortion generated by the amplifier and expand a linear range of an output signal of the amplifier. However, in a case where a sudden change (for example, a change from a narrowband signal to a wideband signal) occurs in a signal input to the amplifier, DPD compensation may not be able to deal with the change. In this case, since the output signal from the amplifier is deteriorated, there is a possibility that desired communication characteristics cannot be obtained.

An object of the present disclosure is to provide a signal processing device, a signal processing method, and a non-transitory computer readable medium for suppressing deterioration of an output signal.

Solution to Problem

A signal processing device according to an aspect of the present example embodiment includes: a distortion compensation circuit configured to execute distortion compensation processing of compensating for nonlinear distortion on an input signal, and output a signal subjected to the distortion compensation processing; an amplifier configured to amplify the signal output from the distortion compensation circuit and output the amplified signal as a communication signal; and a signal output circuit configured to output an adjustment signal for adjusting the distortion compensation processing to the distortion compensation circuit as the input signal at a timing at which the communication signal is not output, the adjustment signal having a frequency band that covers a frequency band of the communication signal.

A signal processing method according to an aspect of the present example embodiment includes: executing, by a distortion compensation circuit, distortion compensation processing of compensating for nonlinear distortion on an input signal, and outputting a signal subjected to the distortion compensation processing; amplifying the signal output from the distortion compensation circuit and outputting the amplified signal as a communication signal for communication; and outputting an adjustment signal for adjusting the distortion compensation processing to the distortion compensation circuit as the input signal at a timing at which the communication signal is not output, the adjustment signal having a frequency band that covers a frequency band of the communication signal.

A non-transitory computer readable medium according to an aspect of the present example embodiment stores a program for causing a computer to perform: executing, by a distortion compensation circuit, distortion compensation processing of compensating for nonlinear distortion on an input signal, and outputting a signal subjected to the distortion compensation processing; amplifying the signal output from the distortion compensation circuit and outputting the amplified signal as a communication signal for communication; and outputting an adjustment signal for adjusting the distortion compensation processing to the distortion compensation circuit as the input signal at a timing at which the communication signal is not output, the adjustment signal having a frequency band that covers a frequency band of the communication signal.

Advantageous Effects of Invention

According to the present disclosure, it is possible to provide the signal processing device, the signal processing method, and the non-transitory computer readable medium for suppressing deterioration of an output signal.

EXAMPLE EMBODIMENT

First Example Embodiment

Figure 1:
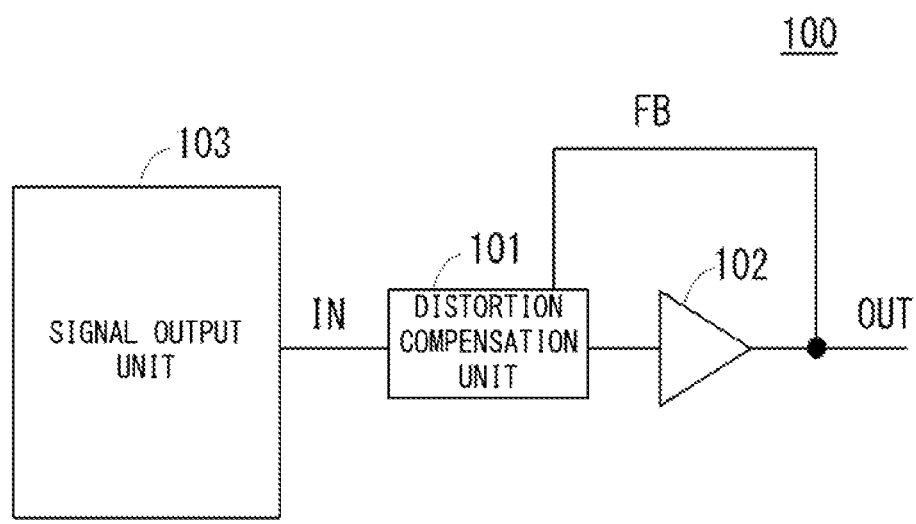
FIG. 1 is a block diagram illustrating an example of a signal processing device according to a first example embodiment.

A first example embodiment of the present disclosure is described below with reference to the drawings. FIG. 1 is a block diagram illustrating a signal processing device according to the first example embodiment. A signal processing device 100 is a device that processes an electrical signal, and can be applied to, for example, a wireless communication device of a communication system, but an application target is not limited thereto.

The signal processing device 100 includes a distortion compensation unit 101, an amplifier 102, and a signal output unit 103. Each component will be described below.

The distortion compensation unit 101 measures nonlinear distortion for an input signal IN, executes distortion compensation processing of compensating for the measured nonlinear distortion, and outputs a signal subjected to the distortion compensation processing to the corresponding amplifier 102. The distortion compensation processing suppresses the nonlinear distortion of the signal output by the amplifier 102.

The distortion compensation unit 101 executes, for example, DPD compensation processing as the distortion compensation processing. In a case where the DPD compensation processing is executed, a DPD compensation coefficient regarding an amplitude and a phase is stored inside the distortion compensation unit 101. The DPD compensation coefficient is a weight for compensating for a nonlinear AM/PM component of the amplifier 102, and the distortion compensation unit 101 selects an appropriate DPD compensation coefficient regarding the amplitude and the phase based on a characteristic of the input signal IN. The distortion compensation unit 101 executes the DPD compensation processing on the input signal IN by using the selected DPD compensation coefficient. For example, the distortion compensation unit 101 stores a lookup table (LUT) in which the value of the amplitude or (I,Q) of the input signal IN and the DPD compensation coefficient corresponding to the value are associated with each other. The distortion compensation unit 101 determines the value of the input signal IN, selects an appropriate DPD compensation coefficient by referring to the LUT based on the value, and executes the DPD compensation processing. The distortion compensation unit 101 appropriately updates the DPD compensation coefficient regarding the amplitude and the phase by using a feedback FB of an output of the amplifier 102.

The amplifier 102 is an amplifier that amplifies a signal output from the distortion compensation unit 101 and outputs the amplified signal as an output signal OUT. The amplifier 102 can output a communication signal used for wireless or wired communication as the output signal OUT. The communication signal may be, for example, a transmission signal transmitted from the signal processing device 100 to another device or a reception signal received by the signal processing device 100 from another device. Any type of amplifier can be used as the amplifier 102.

At a timing at which the communication signal is not output from the amplifier 102, the signal output unit 103 outputs an adjustment signal for adjusting the distortion compensation processing to the distortion compensation unit 101 as the input signal IN, the adjustment signal having a frequency band that covers a frequency band of the communication signal. The "frequency band that covers the frequency band of the communication signal" means that in a case where the frequency band of the communication signal is from a frequency F1 to a frequency F2 (F1>F2) and the frequency band of the adjustment signal is from a frequency F3 to a frequency F4 (F3>F4), F3 is equal to or higher than F1, and F4 is equal to or lower than F2. The adjustment signal is, for example, a dense signal in which a blank frequency band such as a guard band does not exist in the frequency band of the signal. Specifically, a large number of narrowband subcarriers may be multiplexed and transmitted on a frequency axis by performing orthogonal frequency division multiplexing (OFDM) modulation. Specifically, a desired adjustment signal can be generated by allocating transmission data to all subcarriers in the band of the signal and executing inverse fast Fourier transform (IFFT) processing. Furthermore, the adjustment signal may be a signal obtained as modulation by spread spectrum is performed, and the signal is spread over the entire frequency band. The spread spectrum method is a method used in a code division multiple access (CDMA) method, and is, for example, a direct spread method. In the spread spectrum method, a broadband signal can be obtained by applying a scrambling code to transmission data to increase a data rate. However, the adjustment signal is not limited to the above method, and can be generated by any method.

In a case where the communication signal is a transmission signal to be transmitted from the signal processing device 100 to another device, the signal output unit 103 may generate the communication signal at a timing different from that of the generation of the adjustment signal and output the communication signal to the distortion compensation unit 101.

Figure 2A:
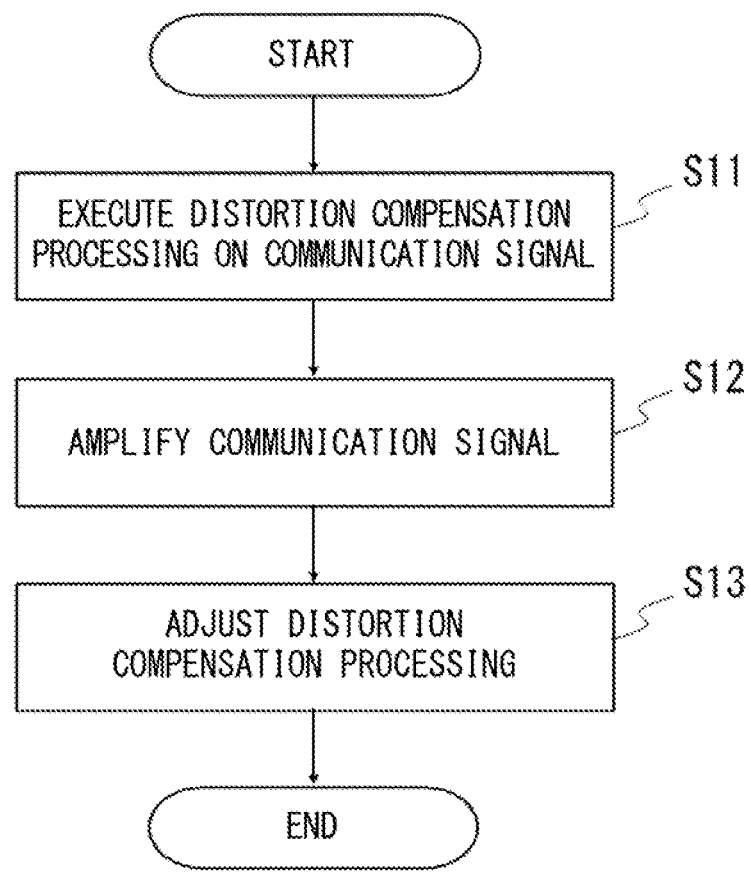
FIG. 2A is a flowchart illustrating an example of processing in the signal processing device according to the first example embodiment.

FIG. 2A is a flowchart illustrating processing executed by the signal processing device 100 in a case where the communication signal is input to the amplifier 102.

First, the distortion compensation unit 101 executes the distortion compensation processing on the input communication signal, and outputs the signal subjected to the distortion compensation processing (step S11). The amplifier 102 amplifies and outputs the communication signal output from the distortion compensation unit 101 (step S12). The distortion compensation unit 101 adjusts the distortion compensation processing by using the feedback FB of the output signal (step S13). Here, the distortion compensation unit 101 updates the DPD compensation coefficient. As the distortion compensation processing is executed in this manner, a SINR of the communication signal can be improved.

Figure 2B:
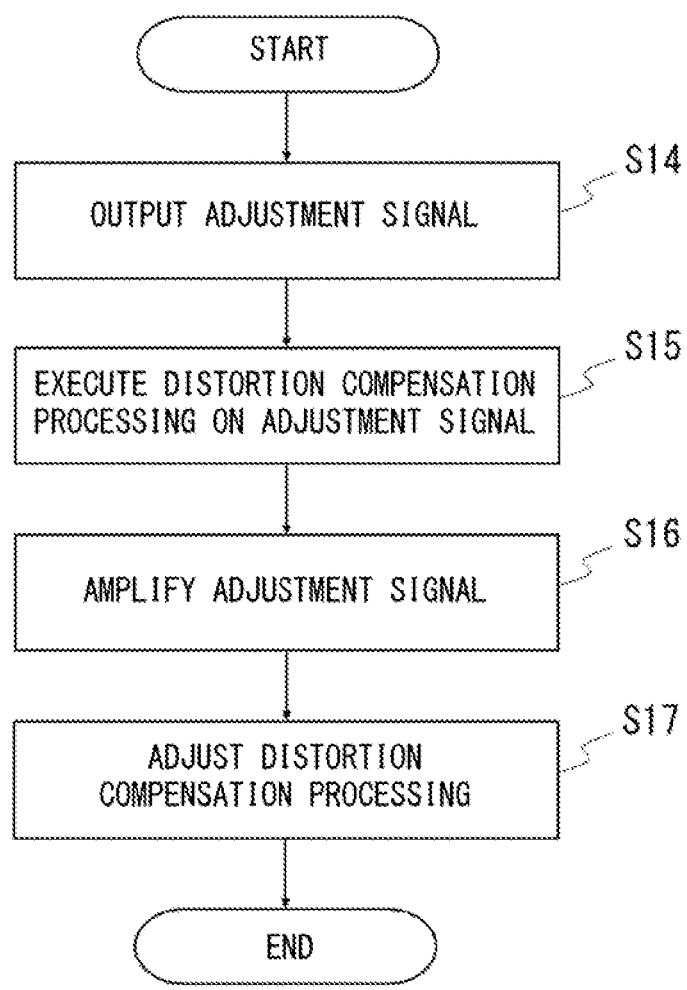
FIG. 2B is a flowchart illustrating an example of processing in the signal processing device according to the first example embodiment.

FIG. 2B is a flowchart illustrating processing executed by the signal processing device 100 in a case where the adjustment signal is input to the amplifier 102 as the input signal at a timing at which the communication signal is not output. First, the signal output unit 103 outputs the adjustment signal to the amplifier 102 as the input signal IN (step S14). The distortion compensation unit 101 executes the distortion compensation processing on the adjustment signal and outputs the adjustment signal subjected to the distortion compensation processing (step S15). The amplifier 102 amplifies and outputs the adjustment signal output from the distortion compensation unit 101 (step S16). The distortion compensation unit 101 adjusts the distortion compensation processing by using the feedback of the output signal (step S17).

As described above, the signal output unit 103 of the signal processing device 100 outputs the adjustment signal including the frequency band of the communication signal within the frequency band to the distortion compensation unit 101 as the input signal IN at a timing at which the communication signal is not output from the amplifier 102. Since the distortion compensation processing is adjusted by using the adjustment signal output from the amplifier 102, the distortion compensation unit 101 sets distortion compensation in such a way that a gain does not drop in the frequency band of the adjustment signal. For example, in a case where the distortion compensation unit 101 executes the DPD compensation processing, the distortion compensation unit 101 updates the DPD compensation coefficient to be suitable for the adjustment signal by using the feedback of the output signal of the amplifier 102. With this update, even in a case where the signal processing device 100 outputs the communication signal after outputting the adjustment signal, it is possible to suppress deterioration of the gain of the communication signal by the distortion compensation unit 101.

As an example, the adjustment signal may be a signal modulated by OFDM or spread spectrum. As a result, the signal processing device 100 can relatively easily generate the adjustment signal capable of suppressing the deterioration of the gain of the communication signal regardless of where on the frequency band of the adjustment signal the frequency component of the communication signal is, according to a known technology.

Note that the signal processing device 100 may be provided with a plurality of amplifiers 102. That is, the signal processing device 100 may include a plurality of signal channels. In this case, the distortion compensation unit 101 may be provided for each signal channel. Alternatively, there may be a signal channel for which the amplifier 102 is provided but the distortion compensation unit 101 is not provided. Furthermore, the distortion compensation unit 101 of one unit may execute the distortion compensation processing on the plurality of signal channels and output signals subjected to the distortion compensation processing to the plurality of amplifiers 102.

Second Example Embodiment

A second example embodiment of the present disclosure is described below with reference to the drawings. In the second example embodiment, the signal processing described in the first example embodiment will be described with a detailed specific example.

Hereinafter, an example of a wireless communication device in which time division duplex (TDD) is used as a communication method and multi user-multi input multi output (MIMO) is used for wireless transmission and reception will be described. In addition, in order to implement high frequency utilization efficiency, a technology of digital beamforming is used in this wireless communication device.

Figure 3:
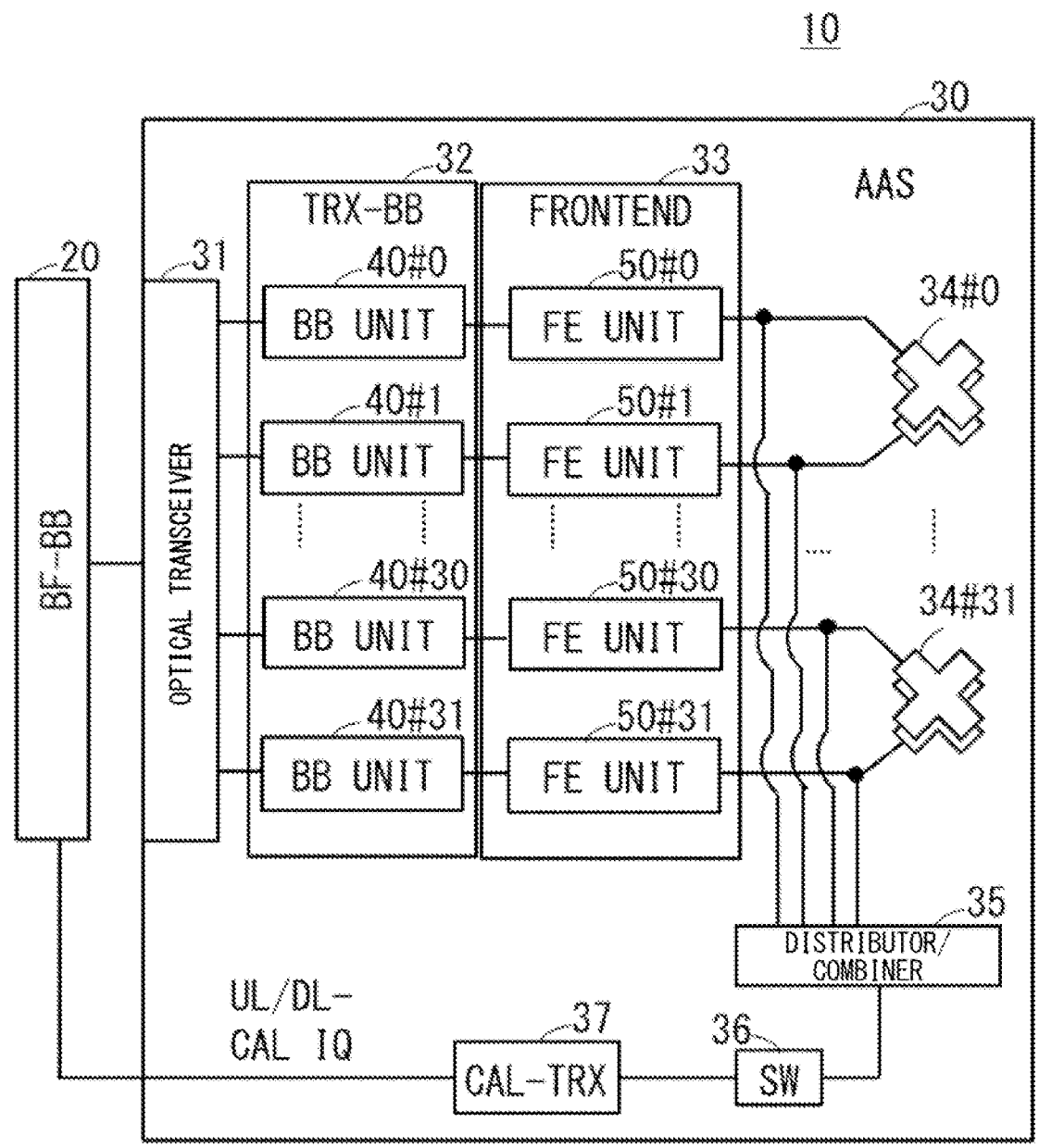
FIG. 3 is a schematic diagram illustrating an example of a wireless communication device according to a second example embodiment.

FIG. 3 is a block diagram illustrating an example of a wireless communication device 10 according to the second example embodiment. The wireless communication device 10 is a specific application example of the signal processing device 100, and is a device mounted with an ultra-multi-element active antenna system (AAS) for 5G and provided in, for example, a base station. As illustrated in FIG. 3, the wireless communication device 10 includes a beamforming-baseband (BF-BB) unit 20 and an AAS unit 30. Here, the AAS unit 30 includes an optical transceiver 31, a TRX-BB unit 32, a frontend unit 33, 32 antennas 34 (wireless transmission units), a distributor/combiner 35, a switch (SW) 36, and a calibration transceiver (CAL-TRX) 37, and a control unit (not illustrated) that controls these units. Note that uplink (UL) described below means a communication path from a user equipment (UE) (not illustrated) to the wireless communication device 10, and downlink (DL) means a communication path from the wireless communication device 10 to the UE.

The BF-BB unit 20 is a baseband unit having a function of generating a beamforming signal. The BF-BB unit 20 stores a preset reception system characteristic [CAL-RX (fixed)] therein. In addition, when the wireless communication device 10 is activated and the BF-BB unit 20 stores a characteristic TX #n*[CAL-RX] of each signal channel acquired by a periodic operation of the TRX-BB unit 32 therein and updates the characteristic every time a new value is obtained. The BF-BB unit 20 performs communication in a DL direction by outputting a communication signal for communication to the AAS unit 30 by using these values. Details of this processing will be described below.

In addition, when the wireless communication device 10 is activated and a DL or UL calibration operation is periodically performed, the BF-BB unit 20 determines and stores a calibration weight (hereinafter, referred to as CAL weight) for DL or UL. The DL/UL-CAL weight is a value for correcting variations in amplitude and phase of each TX or RX to be described below, and is determined by the DL/UL calibration operation based on the DL/UL-CAL signal. For example, the DL calibration is performed to accurately generate an angle and a depth of a null point formed in wireless signal radiation before the wireless communication device 10 transmits a wireless signal by data beamforming.

In a case of performing the DL calibration, the BF-BB unit 20 generates a DL calibration signal (hereinafter, referred to as a DL-CAL signal), which is an IQ signal, and outputs the DL calibration signal to the CAL-TRX 37 via the optical transceiver 31, the TRX-BB unit 32, the frontend unit 33, the distributor/combiner 35, and the SW 36. The CAL-TRX 37 outputs the DL-CAL signal obtained by converting an input RF signal into the IQ signal to the BF-BB unit 20. The BF-BB unit 20 determines the DL-CAL weight to be applied to each signal channel by measuring a difference in amplitude and phase between the original DL-CAL signal and the DL-CAL signal output by the CAL-TRX 37.

Figure 4:
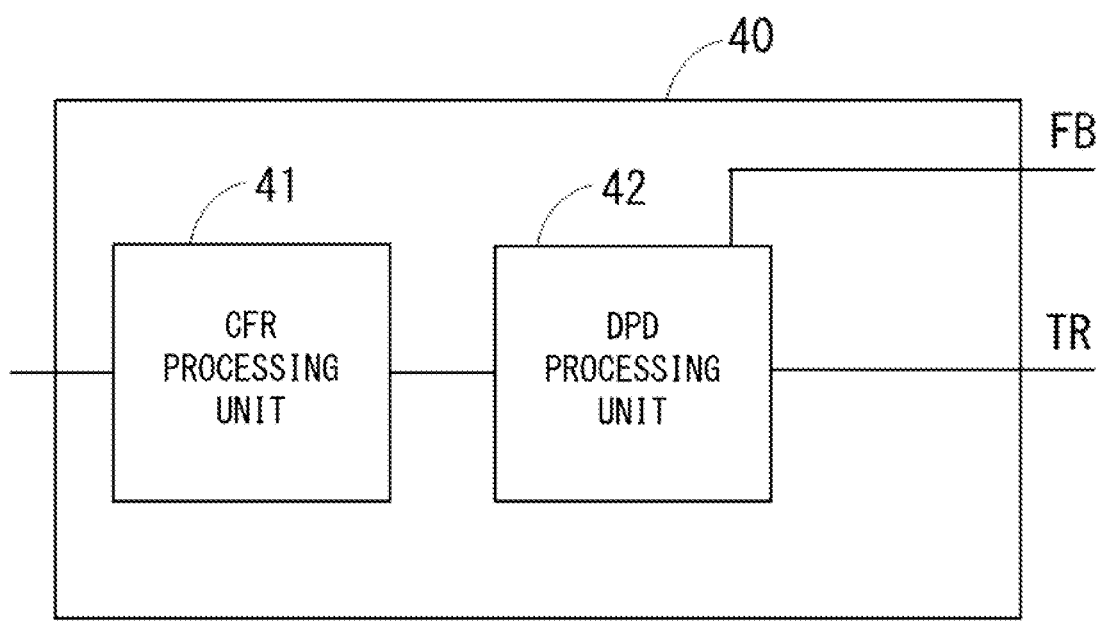
FIG. 4 is a block diagram illustrating an example of a BB unit according to the second example embodiment.

In addition, in a case of performing the UL calibration, the BF-BB unit 20 generates a UL calibration signal (hereinafter, referred to as UL-CAL signal), which is an IQ signal, and directly transmits the UL calibration signal to the CAL-TRX 37. The CAL-TRX 37 outputs the UL-CAL signal obtained by converting the IQ signal into the RF signal to the BF-BB unit 20 via the SW 36, the distributor/combiner 35, the frontend unit 33, the TRX-BB unit 32, and the optical transceiver 31. The BF-BB unit 20 determines the UL-CAL weight to be applied to each signal channel by measuring a difference in amplitude and phase between the original UL-CAL signal and the UL-CAL signal transmitted by the CAL-TRX 37. In this manner, the BF-BB unit 20 functions as a baseband having a function of generating a beamforming signal. In FIGS. 3 and 4, the DL/UL-CAL signal, which is an IQ signal transmitted and received between the BF-BB unit 20 and the CAL-TRX 37, is displayed as DL/UL-CAL IQ.

Next, each unit of the AAS unit 30 will be described. The optical transceiver 31 performs photoelectric conversion and reverse conversion of a signal (for example, a multi-layer signal) transmitted and received between the BF-BB unit 20 and the TRX-BB unit 32.

The TRX-BB unit 32 is a transceiver baseband unit that mediates a communication signal transmitted and received between the optical transceiver 31 and the frontend unit 33, and includes 32 BB units 40 #0 to 40 #31. Hereinafter, the BB units 40 #0 to 40 #31 will be collectively referred to as the BB unit 40.

FIG. 4 is a block diagram of the BB unit 40. The BB unit 40 includes a CFR processing unit 41 and a DPD processing unit 42. Note that each of the BB units 40 #0 to 40 #31 has the same configuration as that illustrated in FIG. 4.

The CFR processing unit 41 suppresses a peak level of the IQ signal (multi-layer signal) output from the BF-BB unit 20 and input via the optical transceiver 31 to a CFR threshold, and outputs the suppressed IQ signal to the DPD processing unit 42. The CFR threshold is a threshold for suppressing the maximum peak component. Specifically, in a case where the amplitude of the input multi-layer signal exceeds the CFR threshold, the CFR processing unit 41 suppresses the amplitude of the multi-layer signal to the CFR threshold and outputs the suppressed multi-layer signal to the DPD processing unit 42.

The DPD processing unit 42 corresponds to the distortion compensation unit 101 according to the first example embodiment, and is provided between each CFR processing unit 41 and each TRX 51. The DPD processing unit 42 compensates for nonlinear distortion in input/output characteristics of AM-AM and AM-PM generated in a transmission amplifier 52 by using the IQ signal (multi-layer signal) output from the CFR processing unit 41 and an IR signal (multi-layer signal) output from the transmission amplifier 52 (transmission power amplifier) and then output via a directional coupler 53 and an FB path. Note that the IR signal is represented as a signal FB in FIGS. 4 and 5.

The DPD processing unit 42 executes the DPD compensation processing of compensating for the amplitude and the phase of the IQ signal for wireless communication output from the CFR processing unit 41 based on the DPD compensation coefficient indicating a reverse characteristic to the input/output characteristic of the transmission amplifier 52 provided downstream, and outputs the signal subjected to the DPD compensation processing to a FE unit 50 as a signal TR. Since the DPD processing unit 42 is provided for each TRX 51, the DPD compensation processing based on the characteristic of the individual TRX 51 can be executed. The DPD compensation processing is executed to improve a signal to interference plus noise ratio (SINR) performance of DL. Further, an error vector magnitude (EVM) and an adjacent channel leakage ratio (ACLR) of the transmission amplifier 52 can be improved by the DPD compensation processing.

Note that a reception signal RE output from the antenna 34 is output to the optical transceiver 31 via the FE unit 50.

Furthermore, the TRX-BB unit 32 outputs a DPD training signal via each DPD processing unit 42 at a timing other than a timing of the DL/UL calibration operation, thereby causing each DPD processing unit 42 to adjust the setting of the DPD compensation. Therefore, the TRX-BB unit 32 corresponds to the signal output unit 103 according to the first example embodiment. Details of this processing will be described below.

Returning to FIG. 3, the description of the AAS unit 30 will be continued. The frontend unit 33 includes 32 FE units 50 #0 to 50 #31.Hereinafter, the FE units 50 #0 to 50 #31 will be collectively referred to as the FE unit 50.

Figure 5:
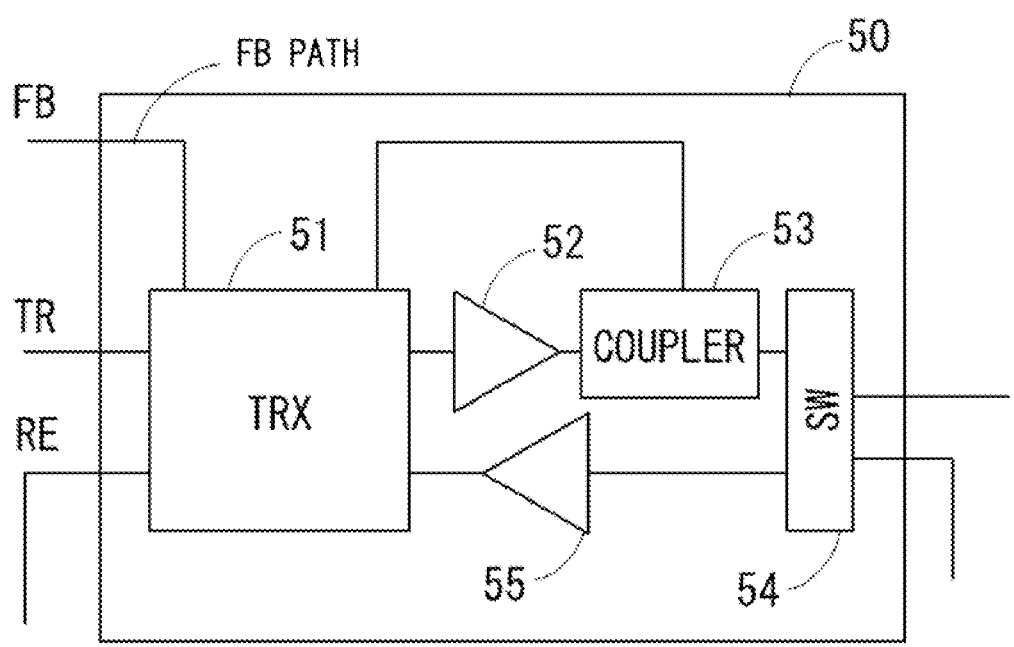
FIG. 5 is a block diagram illustrating an example of an FE unit according to the second example embodiment.

FIG. 5 is a block diagram of the FE unit 50. The FE unit 50 includes the TRX 51, the transmission amplifier (transmission power amplifier) 52, the directional coupler 53, an SW 54, and a reception amplifier (reception power amplifier) 55. Each of the FE units 50 #0 to 50 #31 has the same configuration as that illustrated in FIG. 5.

The TRX 51 is a transceiver and includes a transmitter TX and a receiver RX (not illustrated). The transmitter TX converts the IQ signal received from the TRX-BB unit 32 into the RF signal and outputs the RF signal to the antenna 34 or the CAL-TRX 37. In a case where the wireless communication device 10 transmits the wireless signal, the transmitter TX outputs the RF signal to the antenna 34, and in a case where the DL calibration is performed, the transmitter TX outputs the RF signal to the CAL-TRX 37 via the distributor/combiner 35.

In addition, the receiver RX converts the RF signal received from the antenna 34 or the CAL-TRX 37 into the IQ signal and outputs the IQ signal to the TRX-BB unit 32. In a case where the wireless communication device 10 receives the wireless signal from the UE, the TRX 51 receives the RF signal from the antenna 34. In a case where the UL calibration is performed, the TRX 51 receives the UL-CAL signal (RF signal) from the CAL-TRX 37 via the distributor/combiner 35. Then, the received UL-CAL signal is converted into the UL-CAL signal (IQ signal), and the converted UL-CAL signal is output to the BF-BB unit 20 via the TRX-BB unit 32.

Further, the TRX 51 has the FB path that converts the RF signal FB output from the directional coupler 53 into the IQ signal and outputs the IQ signal to the DPD processing unit 42 described above.

Each transmission amplifier 52 corresponds to the amplifier 102 according to the first example embodiment, and is arranged between each antenna 34 and the TRX 51 provided corresponding to each antenna 34. The transmission amplifier 52 amplifies the RF signal (the signal for wireless communication or the DL-CAL signal) output from the TRX 51 and outputs the RF signal to the directional coupler 53.

Each directional coupler 53 is a coupler provided between each transmission amplifier 52 and each antenna 34. The directional coupler 53 outputs the RF signal output from each transmission amplifier 52 to the antenna 34 and outputs the RF signal to the corresponding TRX 51. The TRX 51 outputs the output RF signal to the DPD processing unit 42 via the FB path. The DPD processing unit 42 receives the IQ signal output from the FB path and compensates for non-linear distortion in the input/output characteristics of AM-AM and AM-PM generated in the transmission amplifier 52 as described above.

The SW 54 is a switch that switches a signal to be input to or output from the TRX 51 based on a control signal from the control unit of the AAS unit 30. That is, a connection destination of the frontend unit 33 is switched under the control of the AAS unit 30.

Specifically, in a case where the wireless communication device 10 performs wireless communication, the SW 54 is controlled in such a way that the frontend unit 33 and the antenna 34 are connected and the frontend unit 33 and the CAL-TRX 37 are not connected in each of the signal channels #0 to #31. As a result, the RF signal from the TRX 51 is output to the antenna 34 at the time of data transmission, and the SW 54 outputs the RF signal from the antenna 34 to the TRX 51 at the time of data reception.

On the other hand, in a case where the wireless communication device 10 performs the DL/UL calibration, the SW 54 is controlled in such a way that the frontend unit 33 and the CAL-TRX 37 are connected and the frontend unit 33 and the antenna 34 are not connected in each of the signal channels #0 to #31. In other words, while the TRX 51 and the distributor/combiner 35 are connected, the antenna 34 and the TRX 51 are disconnected. In a case where the wireless communication device 10 performs the DL calibration, the DL-CAL signal output from the transmission amplifier 52 is output to the distributor/combiner 35. In a case where the wireless communication device 10 performs the UL calibration, the UL-CAL signal output from the distributor/combiner 35 is output to the reception amplifier 55.

The wireless communication device 10 controls each SW 54 to avoid the DL/UL-CAL signal processed by each TRX 51 from being affected by interference from other systems. That is, since an interference component is not included in the DL/UL-CAL signal processed by each TRX 51, the AAS unit 30 can accurately determine the CAL weight to be applied to each TRX 51. Once the DL/UL calibration is completed, the control unit of the AAS unit 30 controls each SW 54 in such a way that each TRX 51 and each antenna 34 are connected.

Each reception amplifier 55 is arranged between each antenna 34 and the TRX 51 provided corresponding to each antenna 34. The transmission amplifier 52 amplifies the received RF signal (the signal for wireless communication or the UL-CAL signal) and outputs the amplified RF signal to the corresponding TRX Returning to FIG. 3, the description of the AAS unit 30 will be continued. The antenna 34 is an antenna provided corresponding to each TRX 51, each transmission amplifier 52, and each reception amplifier 55. The antennas 34 are polarization diversity antennas with polarizations of +45 degrees and −45 degrees orthogonal to each other, and four sets of eight antennas, that is, a total of 32 antennas are provided. Each antenna 34 wirelessly transmits the RF signal received from each FE unit 50 to one or a plurality of UEs. At least one of a filter or a duplexer may be appropriately provided upstream of each antenna 34.

In a case where the wireless communication device 10 performs the DL calibration, the distributor/combiner 35 combines the DL-CAL signal output from each SW 54, and outputs the combined DL-CAL signal to the SW 36. In addition, in a case where the UL calibration is performed, the distributor/combiner 35 distributes the UL-CAL signal output from the SW 36 and outputs the distributed UL-CAL signal to each SW 54.

The SW 36 is a switch that switches a signal direction. In a case where the wireless communication device 10 performs the DL calibration, the SW 36 causes the DL-CAL signal output from the distributor/combiner 35 to be output to the SW 36. In a case where the wireless communication device 10 performs the UL calibration, the SW 36 causes the UL-CAL signal output from the SW 36 to be output to the distributor/combiner 35.

In a case where the wireless communication device 10 performs the DL calibration, the CAL-TRX 37 converts the DL-CAL signal (RF signal) output from the SW 36 into the DL-CAL signal (IQ signal). Then, the converted DL-CAL signal is output to the BF-BB unit 20.

In addition, in a case where the wireless communication device 10 performs the UL calibration, the CAL-TRX 37 converts the UL-CAL signal (IQ signal) output from the BF-BB unit 20 into the UL-CAL signal (RF signal), and outputs the converted UL-CAL signal to the SW 36. Note that the CAL-TRX 37 may include a transmitter and a receiver similarly to the TRX 51.

Hereinafter, the DL calibration operation and the UL calibration operation of the wireless communication device 10 will be described.

<DL Calibration Operation>

First, the DL calibration operation will be described. First, the BF-BB unit 20 outputs a preset DL-CAL signal (IQ signal) to the frontend unit 33 via the optical transceiver 31 and the TRX-BB unit 32. (The transmitter TX of) each TRX 51 in the frontend unit 33 converts the DL-CAL signal (IQ signal) into the DL-CAL signal (RF signal). The DL-CAL signal (RF signal) converted by each TRX 51 is output to the distributor/combiner 35 via the transmission amplifier 52 and the SW 54 and combined by the distributor/combiner 35. The DL-CAL signal combined by the distributor/combiner 35 is output to the CAL-TRX 37 via the SW 36. Note that the AAS unit 30 may output the DL-CAL signal at a timing different for each signal channel.

The CAL-TRX 37 converts the received DL-CAL signal (RF signal) into the DL-CAL signal (IQ signal) and outputs the DL-CAL signal to the BF-BB unit 20. The DL-CAL signal transmitted from the CAL-TRX 37 is in a state where the DL-CAL signal transmitted from each TRX 51 #n is combined by frequency multiplexing. Therefore, the BF-BB unit 20 performs frequency separation on the DL-CAL signal transmitted from the CAL-TRX 37 by fast Fourier transform (FFT), extracts the DL-CAL signal for each of the signal channels #0 to #31, and calculates the DL-CAL weight.

Specifically, the BF-BB unit 20 measures the difference in amplitude and phase between the DL-CAL signal of the DL-CAL signal transmitted for each signal channel and the original DL-CAL signal (that is, before transmission), thereby learning the variation in amplitude and phase of the DL-CAL signal for each signal channel. The BF-BB unit 20 calculates the DL-CAL weight of each TRX 51 #*n* based on the learning result.

Here, the DL-CAL weight of each TRX 51 #*n* is obtained by multiplying a transmission system characteristic (amplitude and phase characteristic) [TX #n] of the TRX 51 #*n* and a reception system characteristic (amplitude and phase characteristics) [CAL-RX] of the CAL-TRX 37 as expressed by the following Formula 1.

$$DL\text{calibration weight}=[TX\ \#n]\times[CAL\text{-}RX] \quad \text{[Mathematical Formula 1]}$$

The DL calibration operation is completed in this manner. The BF-BB unit 20 stores the DL-CAL weight therein. Thereafter, during the wireless communication related to normal DL, the BF-BB unit 20 outputs a DL signal weighted by the DL-CAL weight for each TRX 51 to each TRX 51.

Next, an operation example of a DL operation of the BF-BB unit 20 will be described. The BF-BB unit 20 generates a BF signal (IQ signal) by an internal circuit. Then, the generated BF signal is corrected with the above-described DL-CAL weight for each of the signal channels #0 to #31 and then output to the TRX-BB unit 32 via the optical transceiver 31.

Specifically, the BF-BB unit 20 multiplies the BF signal by a fraction having the DL-CAL weight as a denominator and the fixed reception system characteristic [CAL-RX (fixed)] of the CAL-TRX 37 as a numerator. The corrected BF signal is expressed by the following Formula 2. Note that [CAL-RX (fixed)] is stored in advance in a storage unit (not illustrated) of the BF-BB unit 20.

$$BF \times \frac{[CAL-RX\ (\text{fixed})]}{[TX\ \#\ n]\times[CAL-RX]} \quad \text{[Mathematical Formula 2]}$$

The corrected BF signal is converted from the IQ signal into the RF signal by each TRX 51 #*n* of the TRX-BB unit 32 and transmitted, amplified by each transmission amplifier 52 #*n*, and output from the frontend unit 33. Since the BF signal output from the frontend unit 33 passes through each TRX 51 #*n*, the BF signal is expressed as the following Formula 3.

$$BF \times \frac{[CAL-RX\ (\text{fixed})]}{[TX\ \#\ n]\times[CAL-RX]} \quad \text{[Mathematical Formula 3]}$$

In addition, Formula 3 is expressed as the following Formula 4 when [TX #n] is deleted and simply expressed.

$$BF \times \frac{[CAL-RX\ (\text{fixed})]}{[CAL-RX]} \quad \text{[Mathematical Formula 4]}$$

In Formula 4, if [CAL-RX (fixed)]=[CAL-RX], the BF signal is in an ideal state, and the BF signal in the ideal state is transmitted from each antenna 34 #*n*. Note that stability of the CAL-RX is important in order to satisfy [CAL-RX (fixed)]=[CAL-RX].

By performing the above operation, it is possible to compensate for a variation in amplitude and phase identification of each transmitter TX #n. With the DL calibration operation, it is possible to accurately determine the angle and the depth of the null point formed in the wireless signal radiation before transmitting the wireless signal by data beamforming. In addition, it is also possible to suppress generation of nonlinear distortion radiation caused by third-order intermodulation distortion in each direction of the space.

Note that the update of the DL-CAL weight described above may be performed between transmission of the wireless signal by fan beamforming and transmission of the wireless signal by data beamforming as described below. Alternatively, the DL-CAL weight may be updated periodically. As still another example, the wireless communication device 10 may update the DL-CAL weight with detection of an environment change (for example, a temperature change) or a signal change over time by a sensor of the wireless communication device 10 as a trigger. The update cycle in this case is, for example, one minute or more.

<UL Calibration Operation>

Next, the UL calibration operation will be described. The BF-BB unit 20 directly outputs a preset UL-CAL signal (IQ signal) to the CAL-TRX 37. The CAL-TRX 37 converts the UL-CAL signal (IQ signal) into the UL-CAL signal (RF signal). The UL-CAL signal (RF signal) converted by the CAL-TRX 37 is output to the distributor/combiner 35 via the SW 36 and distributed by the distributor/combiner 35. The UL-CAL signal distributed by the distributor/combiner 35 is output to each TRX 51 via each SW 54 and the reception amplifier 55. Each TRX 51 converts the UL-CAL signal (RF signal) into the UL-CAL signal (IQ signal) and outputs the UL-CAL signal to the BF-BB unit 20 via the TRX-BB unit 32 and the optical transceiver 31.

The BF-BB unit 20 measures a difference in amplitude and phase between the UL-CAL signal of the UL-CAL signal received by each TRX 51 and the original UL-CAL signal, and learns a variation in amplitude and phase of the UL-CAL signal. The BF-BB unit 20 calculates the UL-CAL weight of each TRX 51 based on the learning result.

The UL calibration operation is completed in this manner. The BF-BB unit 20 stores the UL-CAL weight therein. Thereafter, during the wireless communication related to normal UL, the BF-BB unit 20 outputs a UL signal weighted by the UL-CAL weight for each TRX 51 to each TRX 51.

<Calibration Execution Timing>

Next, DL and UL calibration execution timings will be described. As described above, the wireless communication device 10 is a wireless communication device compatible with a TDD mode (TDD communication method). The TDD mode is a communication method in which transmission and reception are performed by temporally switching between DL communication and UL communication using the same frequency in uplink and downlink (UL/DL). A DL slot is transmitted in the DL communication, and a UL slot is transmitted in the UL communication. In addition, a flexible slot is transmitted at a timing at which switching from the DL communication to the UL communication is made. The flexible slot is a slot including a DL symbol, a UL symbol, and a flexible symbol. The DL symbol is a field reserved for the DL communication, the UL symbol is a field reserved for the UL communication, and the flexible symbol is a field in which either the DL communication or the UL communication may be performed.

For example, the wireless communication device 10 performs either the DL calibration or the UL calibration in a transient period in which DL is switched to UL in the flexible symbol or in a transient period in which switching from the UL slot to the DL slot is made.

<Transmitter Power Level During Calibration Execution>

Figure 6:
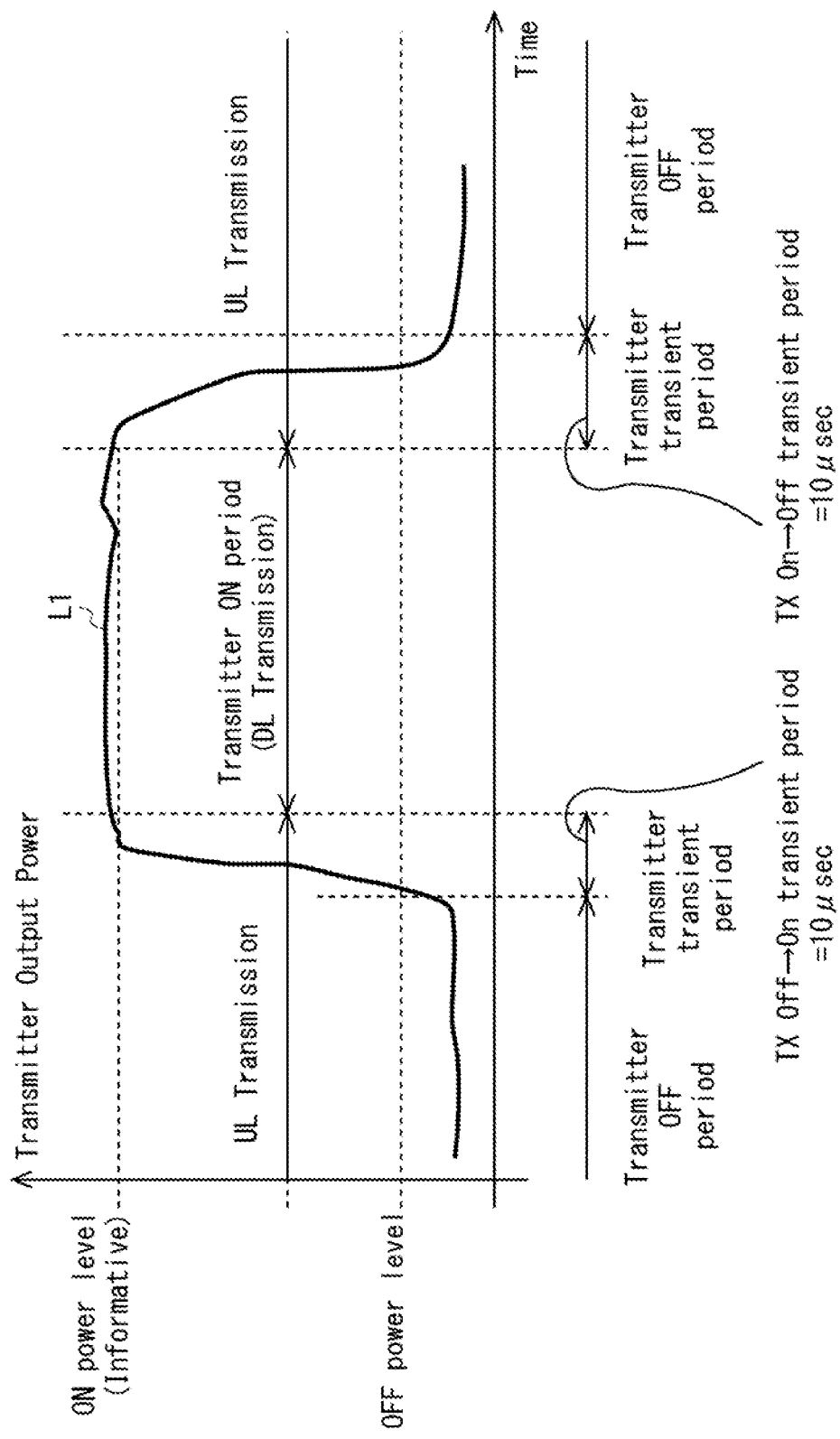
FIG. 6 is a graph illustrating an example of a power level of a transmitter in the wireless communication device according to the second example embodiment.

FIG. 6 illustrates a power level of the transmitter TX at each of a DL timing and a UL timing. In FIG. 6, the horizontal axis represents time, and the vertical axis represents the power level. A solid line L1 in FIG. 6 indicates transition of the transmission power level of the transmitter TX of the wireless communication device 10. It can be seen from FIG. 6 that the transmission power level that was an OFF power level in the initial transmitter OFF period becomes an ON power level in a transmitter ON period through a transmitter transient period, and becomes the OFF power level in the transmitter OFF period through the transmitter transient period again. In FIG. 6, a time period described as UL transmission indicates a time period of the UL communication. In addition, a time period described as the DL transmission indicates a time period of the DL communication. In addition, a time period described as the UL transmission indicates a time period of the UL communication.

The wireless communication device 10 performs the DL calibration or UL calibration in the DL/UL switching period (transmitter transient period). This time period is included in a period of an uplink-downlink frame timing. (a) A time period in which the transmitter TX transitions from an OFF state to an ON state and (b) a time period in which the transmitter TX transitions from the ON state to the OFF state are, for example, 10 µs. The wireless communication device 10 can perform the above-described DL calibration or UL calibration in at least one of the period (a) or the period (b). That is, in this example, an output time of the DL/UL-CAL signal may be within 10 µs. In addition, it is sufficient if the power of the DL/UL-CAL signal is equal to or less than the maximum rating. In this manner, the DL-CAL weight is periodically calculated and stored in the BF-BB unit 20.

<Frequency Arrangement of DL-CAL Signal>

Further, an example of frequency arrangement of the DL-CAL signal whose frequency is orthogonal for each TRX #n will be described. Here, as illustrated in FIG. 3, an example of the frequency arrangement of the DL-CAL signal for each transmitter TX #n in a case where 32 TRXs #n are provided will be described.

An example of the frequency arrangement of the DL-CAL signal for each transmitter TX #n will be described with reference to FIG. 7. FIG. 5 illustrates the frequency arrangement of the DL-CAL signal for each transmitter TX #n.

Figure 7:
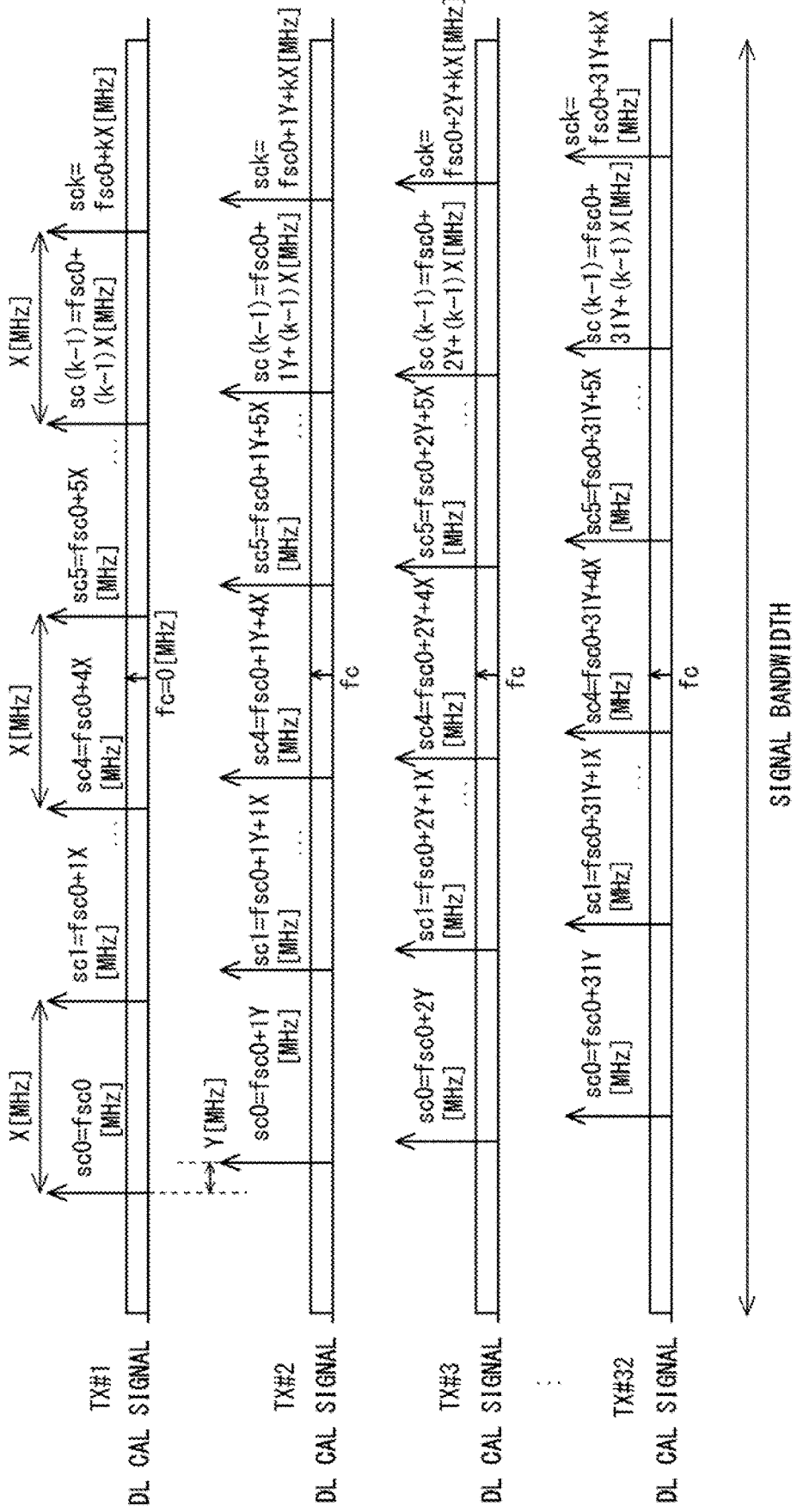
FIG. 7 is a diagram illustrating an example of frequency arrangement of a DL calibration signal for each transmitter according to the second example embodiment.

In FIG. 7, in the frequency arrangement of the DL-CAL signal of one transmitter TX #n, subcarriers used to transmit the DL-CAL signal are arranged at an interval of X [MHz]. The frequency arrangement of the DL-CAL signal is shifted by Y [MHz] in a frequency direction between adjacent transmitters TX #n. Note that fs0 [MHz] is a reference frequency.

Here, in the example illustrated in FIG. 7, it is necessary to satisfy the following two frequency arrangement conditions A1 and A2.

Frequency arrangement condition A1:
X [MHz]>Y [MHz]×(the number of transmitters TX #n−1) holds.

Frequency arrangement condition A2:
A frequency "sc0=fs0 [MHz]" of the lowermost subcarrier sc0 of the DL-CAL signal for a transmitter TX #1 to a frequency "sck=fsc0+31Y+kX [MHz]" of the uppermost subcarrier sck of the DL-CAL signal for a transmitter TX #31 are within a range of the signal bandwidth.

Figure 8A:
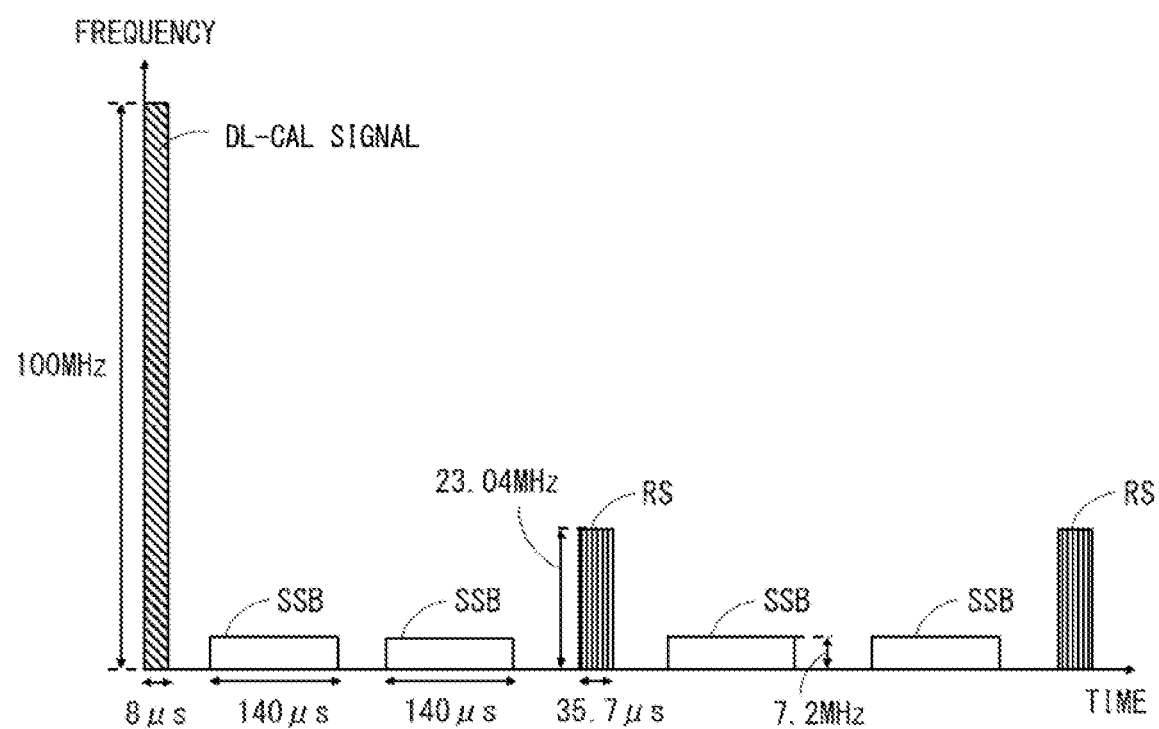
FIG. 8A is a graph illustrating an example of each signal according to the second example embodiment.

Next, a specific problem according to the second example embodiment will be described. FIG. 8A is a graph illustrating an example of each signal output in the wireless communication device 10. In FIG. 8A, the horizontal axis (X axis) represents time, the vertical axis (Y axis) represents frequency, and the signal output from the frontend unit 33 is illustrated in the graph of FIG. 8A. In FIG. 8A, the wireless communication device 10 does not perform individual data communication with the UE, and the wireless communication device 10 periodically outputs a synchronization signal block (SSB) and a reference signal (RS). In addition, the wireless communication device 10 outputs the DL-CAL signal at the initial time when an enable signal by which the transmitter TX of the TRX 51 transitions from the off state to the on state is output.

In this example, the frequency band of the DL-CAL signal is 100 MHz, and the output time of the signal is 8 µs. Meanwhile, the frequency band of the SSB is 7.2 MHz, the output time is 140 µs, the frequency band of the RS is 23.04 MHz, and the output time is 35.7 µs. The output time of the DL-CAL signal is considerably shorter than that of the SSB, but the frequency band of the DL-CAL signal is considerably larger than that of the SSB. Therefore, the DL-CAL signal can be referred to as a broadband signal, and the SSB can be referred to as a narrowband signal. Note that the output time of the DL-CAL signal is a value less than 10 µs, which is the transition time of the transmitter TX, as described above.

Figure 8B:
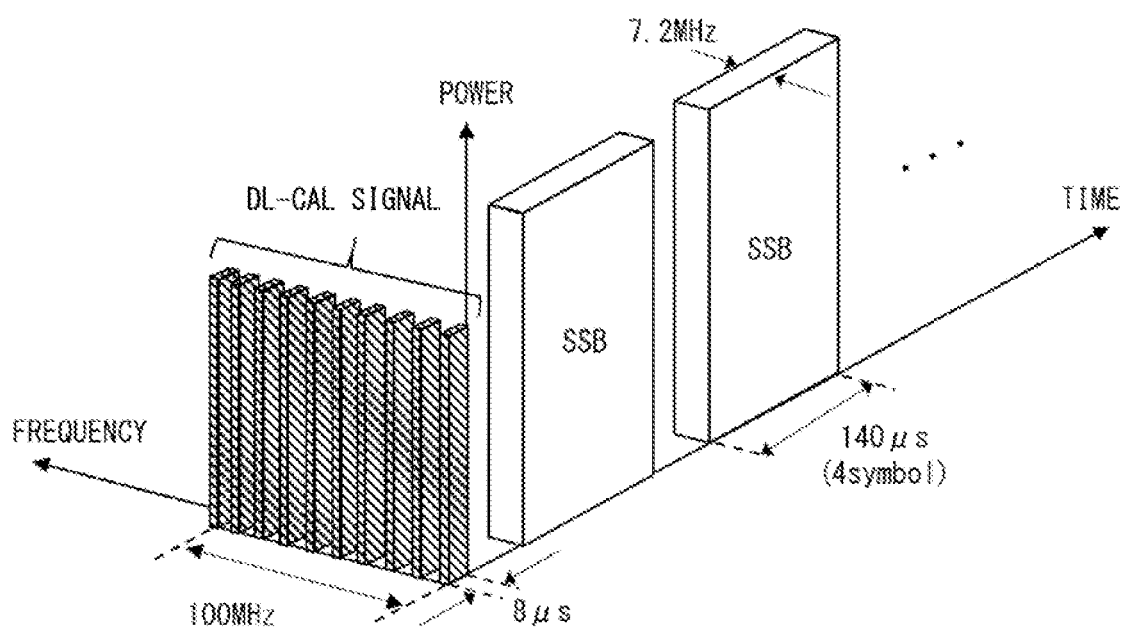
FIG. 8B is a three-dimensional graph illustrating a detailed example of a CAL signal and an SSB according to the second example embodiment.

FIG. 8B is a three-dimensional graph illustrating details of the DL-CAL signal and the SSB illustrated in FIG. 8A. XY axes in FIG. 8B indicate time and frequency similarly to FIG. 8A. A Z-axis in FIG. 8B indicates power of each signal.

As illustrated in FIG. 8B, the DL-CAL signal includes a total of 10 subcarriers in a frequency band of 100 MHz. The frequency bands and the powers occupied by the respective subcarriers are substantially the same. In addition, the power of the peak level of the DL-CAL signal is lower than the power of the peak level of the SSB.

Figure 8C:
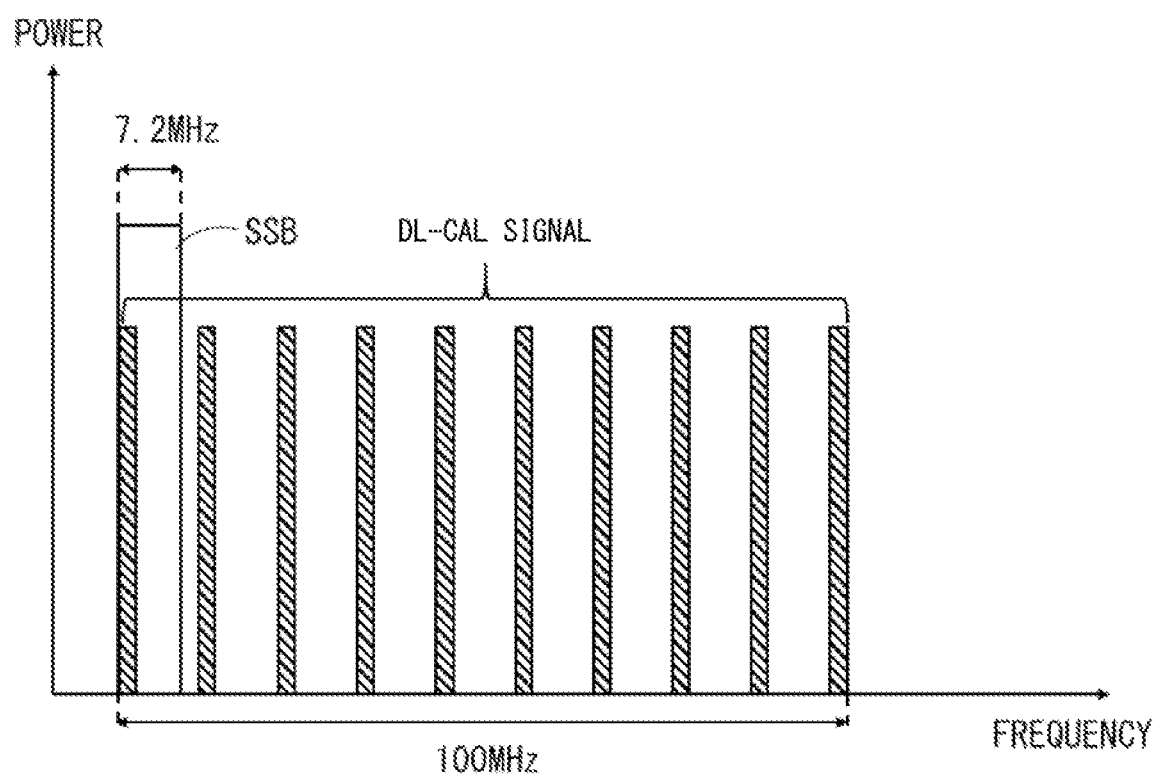
FIG. 8C is a graph illustrating a detailed example of the CAL signal and the SSB according to the second example embodiment.

FIG. 8C is a two-dimensional graph illustrating a relationship between the frequency and the power extracted from the graph illustrated in FIG. 8B. In FIG. 8C, the horizontal axis (X axis) represents frequency, and the vertical axis (Y axis) represents power. As illustrated in FIG. 8C, the frequency band of each subcarrier of the DL-CAL signal is smaller than the frequency band of the SSB.

In a case where the DL-CAL signal is the signal described above, the following problem may occur when the wireless communication device 10 transmits the wireless signal.

FIGS. 9A to 9D are graphs illustrating an example of the DL-CAL signal output from the frontend unit 33 in a case where the wireless communication device 10 performs the DL calibration in a state where DPD compensation is turned off or on. In this example, how the DL-CAL signal is output after the SSB is output from the frontend unit 33 is illustrated.

Figure 9A:
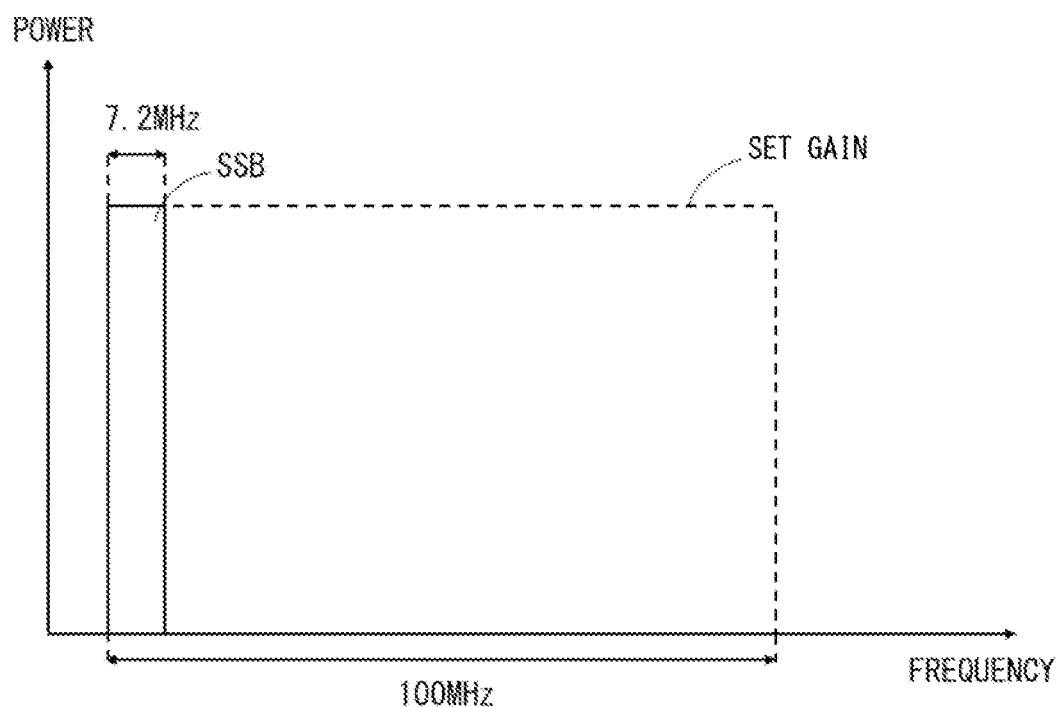
FIG. 9A is a graph illustrating an example of a gain in a predetermined frequency band in a state where DPD is turned off in the second example embodiment.

FIG. 9A is a graph illustrating a case where the AAS unit 30 generates and outputs the SSB in a state where the DPD processing unit 42 does not execute the DPD compensation processing. FIG. 9A illustrates a state where an output level of a transmitter gain set by the AAS unit 30 is constant regardless of the frequency in a case where the DPD compensation processing is not executed (the DPD is turned off).

Figure 9B:
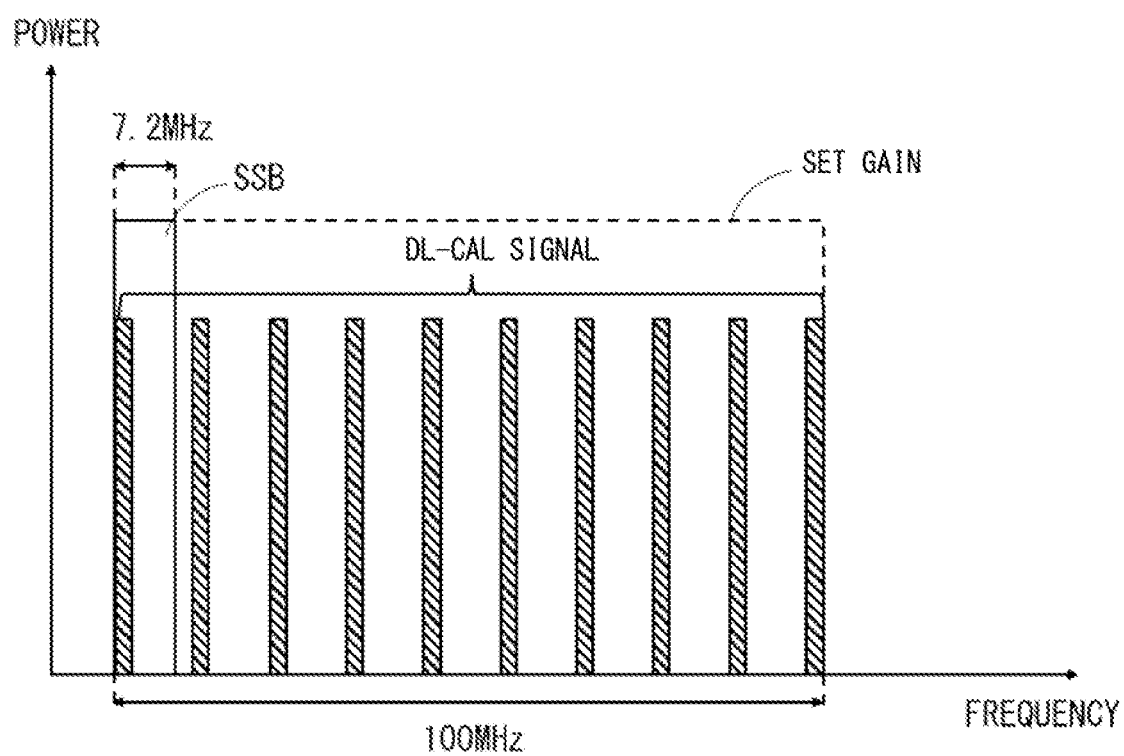
FIG. 9B is a graph illustrating an example of a DL-CAL signal in a case where DL calibration is performed in a state where DPD is turned off in the second example embodiment.

FIG. 9B is a graph illustrating a case where the AAS unit 30 generates and outputs the DL-CAL signal after FIG. 9A (that is, after the AAS unit 30 generates and outputs the SSB). The DL-CAL signal is output based on a frequency characteristic of the transmitter gain that is constant regardless of the frequency as illustrated in FIG. 9A and the output level (for example, OFDM output level) of the original DL-CAL signal itself. As described above, since the gain and the output level are flat (constant) regardless of the frequency band, powers of ten subcarriers of the DL-CAL signal output by the DPD processing unit 42 are substantially the same. Then, only an amplitude level error between the transmitters is corrected by being learned using the DL-CAL signal. Therefore, the DL calibration in the wireless communication device 10 is performed without any problem, and the above-described DL-CAL weight is accurately calculated.

Figure 9C:
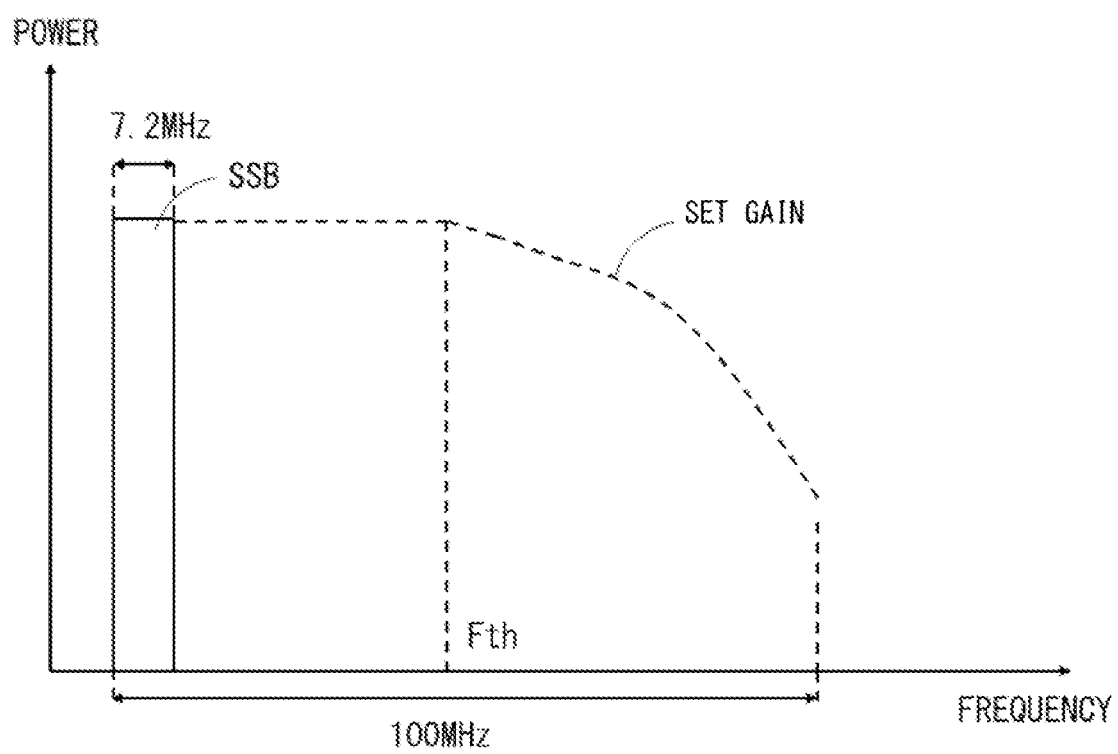
FIG. 9C is a graph illustrating an example of a gain in a predetermined frequency band in a state where DPD is turned on in the second example embodiment.

FIG. 9C is a graph illustrating a case where the AAS unit 30 generates and outputs the SSB in a state where the DPD processing unit 42 executes the DPD compensation processing. In the situation in FIG. 9C, unlike FIG. 9A, the DPD correction performed by the AAS unit 30 is targeted for a signal region in which a spectrum exists only in some frequency bands. In other words, the range of the frequency band in which the nonlinear distortion compensation is performed is narrowed. Then, the frequency characteristic of the transmitter gain is temporarily set to a gain frequency characteristic in which band limitation is applied by a band pass filter (BPF) in such a way that a frequency around the frequency of the SSB is within the band. In a case where a broadband signal that is a signal different from the SSB passes through the AAS unit 30 in the next DL slot, the frequency characteristic of the transmitter gain changes as if the same BPF band is changed in DPD update processing. For the above reason, as illustrated in FIG. 9C, the frequency characteristic in the band of 100 MHz is not constant, and may be filtered. Therefore, in the example of FIG. 9C, the transmitter gain has such a frequency characteristic that the transmitter gain is unreasonably weighted in such a way as to drop with a certain frequency Fth as a boundary in the frequency band of 100 MHz in which the DL-CAL signal is output. As a result, the output level of the DL-CAL signal output from the AAS unit 30 is also unreasonably weighted.

Figure 9D:
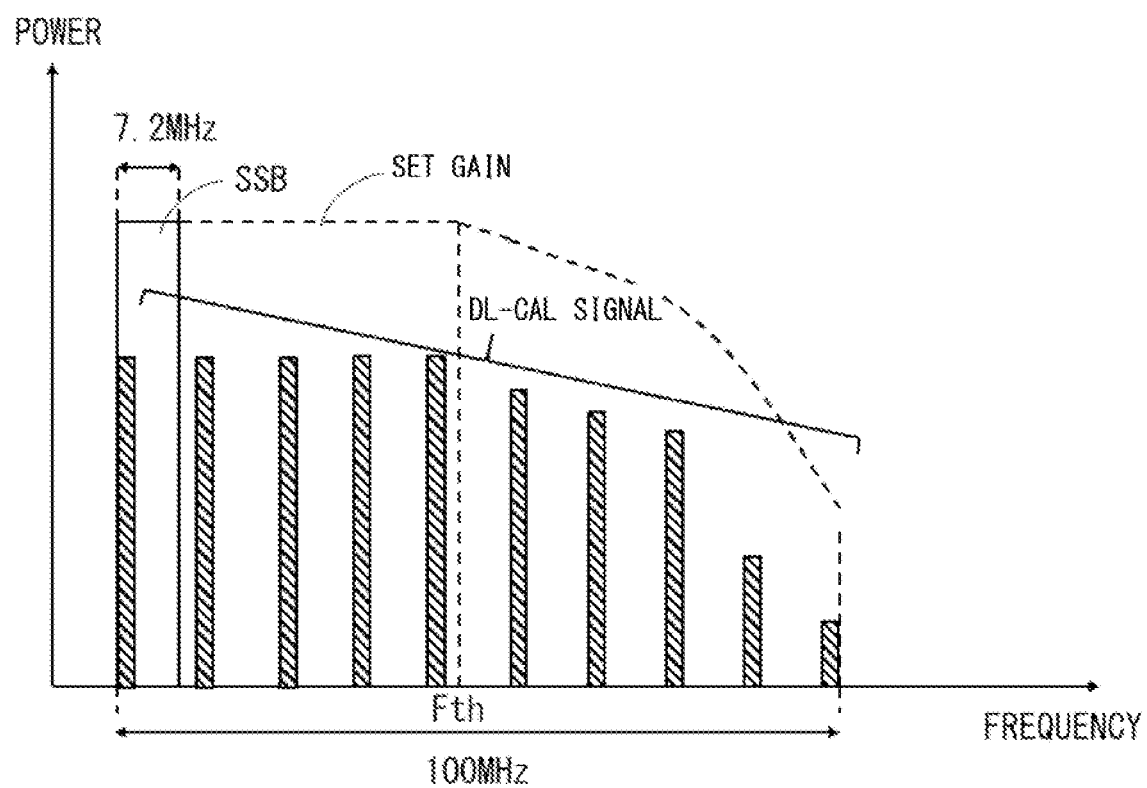
FIG. 9D is a graph illustrating an example of a DL-CAL signal in a case where DL calibration is performed in a state where DPD is turned on in the second example embodiment.

FIG. 9D is a graph illustrating a case where the AAS unit 30 generates and outputs the SSB and then the AAS unit 30 generates and outputs the DL-CAL signal in the state illustrated in FIG. 9C. Originally, the DPD processing unit 42 changes its own compensation coefficient according to the input signal. However, as described above, the output time of the DL-CAL signal is 8 μs which is very short. Therefore, the DPD processing unit 42 cannot change its own compensation coefficient in time according to the DL-CAL signal, and outputs the DL-CAL signal based on the gain set in FIG. 9C. As a result, the gain of the ten subcarriers of the DL-CAL signal drop with the frequency Fth as a boundary, as illustrated in FIG. 9D. Therefore, since the DL calibration in the wireless communication device 10 is performed with a signal different from the original DL-CAL signal, the DL-CAL weight is not accurately calculated.

A similar phenomenon may occur not in the DL-CAL signal but in a broadband signal related to data communication. This phenomenon continues until the DPD processing unit 42 changes its own compensation coefficient next time. In addition, the EVM and the ACLR of the transmission amplifier 52 also deteriorate.

In the second example embodiment, even in a case where it is assumed that the wireless communication device 10 performs the DL calibration after transmitting the SSB as the wireless signal, the DL calibration can be accurately performed by the following processing.

Figure 10A:
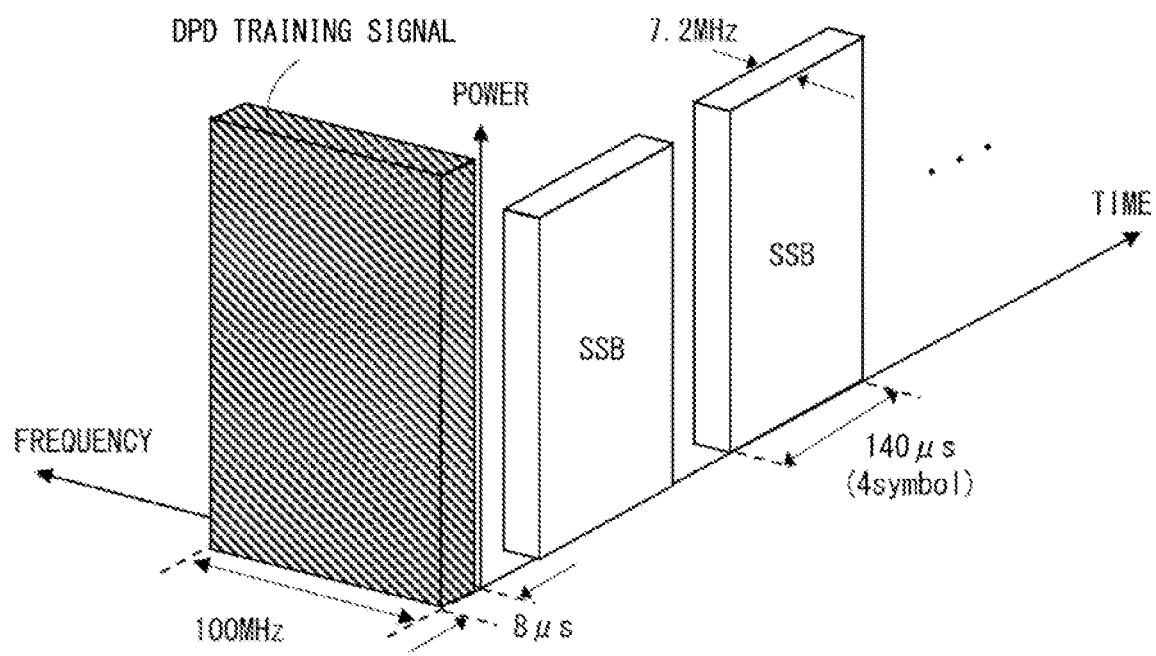
FIG. 10A is a three-dimensional graph illustrating a detailed example of a DPD training signal and the SSB according to the second example embodiment.

FIG. 10A is a three-dimensional graph illustrating a detailed example of the DPD training signal and the SSB. An X axis, a Y axis, and a Z axis in FIG. 10A represent time, frequency, and power of the signal, respectively.

The DPD training signal is a broadband and high-density signal that is generated by the TRX-BB unit 32 using OFDM modulation, passes through the DPD processing unit 42, and is output to the transmission amplifier 52. The DPD training signal has a frequency band of 100 MHz, and in the frequency band, a large number of subcarriers are orthogonally multiplexed on the frequency axis. Here, the frequency bands and the powers occupied by the respective subcarriers are substantially the same. Note that the output time of the DPD training signal may be equal to or shorter than a time taken by the transmitter TX to transition from the OFF state to the ON state or from the ON state to the OFF state as described below. In this example, the output time is 8 μs. In addition, the power of the DPD training signal may be equal to or less than the maximum rating.

Figure 10B:
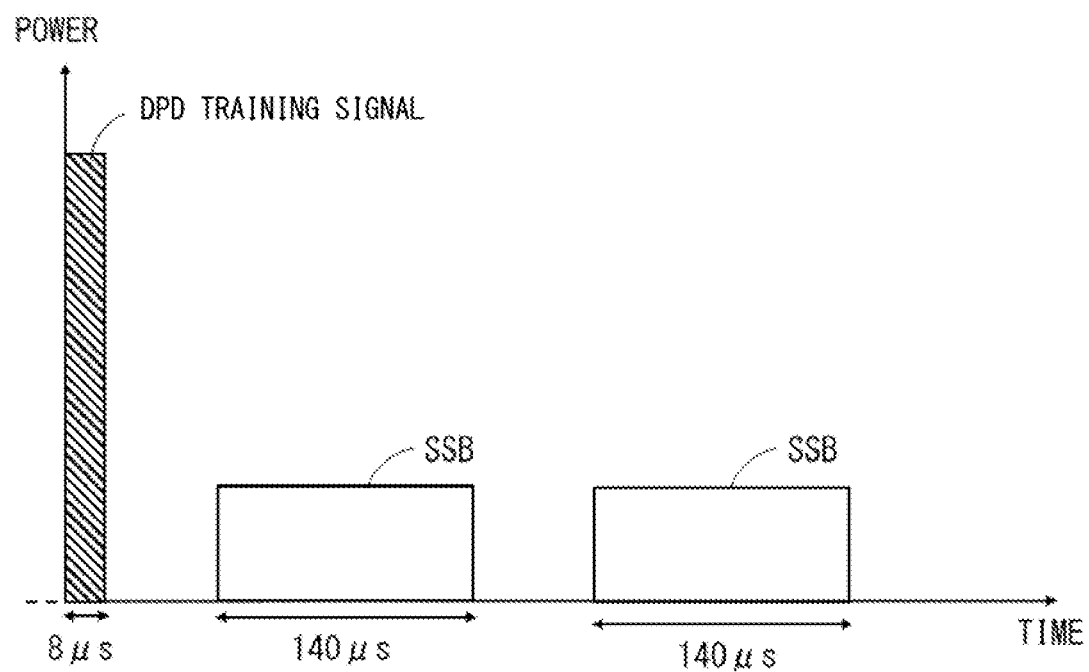
FIG. 10B is a graph illustrating a detailed example of the DPD training signal and the SSB according to the second example embodiment.

FIG. 10B is a two-dimensional graph illustrating a relationship between the frequency and the power extracted from the graph illustrated in FIG. 10A. In FIG. 10B, the horizontal axis (X axis) represents frequency, and the vertical axis (Y axis) represents power. As illustrated in FIG. 10B, the power of the peak level of the DPD training signal is higher than the power of the peak level of the SSB (communication signal). However, the power of the peak level of the DPD training signal is lower than the power of the peak level at the time of maximum rated transmission.

Figure 11:
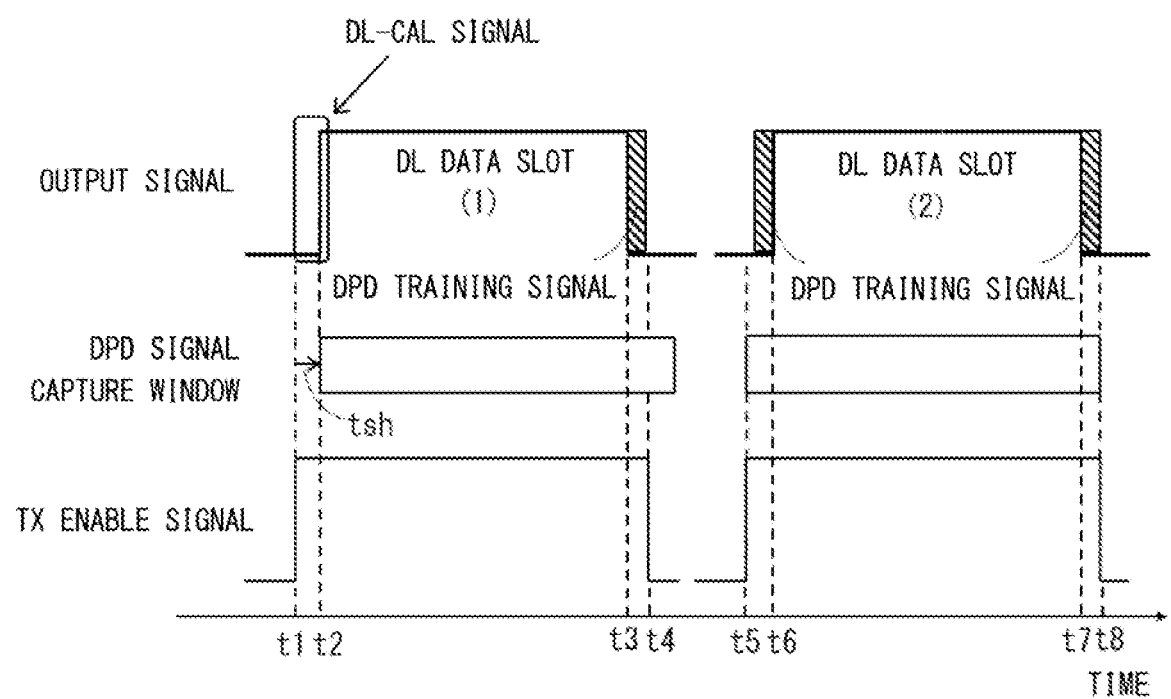
FIG. 11 is a graph illustrating an example of a timing at which the DPD training signal is output according to the second example embodiment.

FIG. 11 is a graph illustrating an example of a timing at which the DPD training signal is output. In FIG. 11, the horizontal axis represents time. The upper part of FIG. 11 illustrates an output signal output in the DL direction in the frontend unit 33, the middle part illustrates a DPD signal capture window in the DPD processing unit 42, and the lower part illustrates a TX enable signal of the transmitter TX in the TRX 51.

The DPD signal capture window indicates a period in which the DPD processing unit 42 fetches IQ data to be used for updating the DPD compensation coefficient. The DPD processing unit 42 updates the DPD compensation coefficient by using a part of data in this period according to the DPD processing.

The DPD processing unit 42 is set to store data used for updating the DPD compensation coefficient in the DPD signal capture window from a time when the maximum peak is detected. Furthermore, the TRX-BB unit 32 outputs the DPD training signal in such a way that the DPD training signal has the maximum peak of the signal at the beginning of the signal period. As such, the DPD processing unit 42 may store the entire DPD training signal.

Hereinafter, FIG. 11 will be described in chronological order. The control unit of the AAS unit 30 grasps a timing of a DL data slot, and turns on the TX enable signal at a timing t1 slightly before the start of the DL data slot. As a result, the transmitter TX in the TRX 51 operates. This period corresponds to the transient period described above.

In a period from the timing t1 to a timing t2 of the start of the DL data slot, the BF-BB unit 20 generates and outputs the DL-CAL signal. Accordingly, the wireless communication device 10 performs the DL calibration as described above. In this example, the DL calibration is periodically performed in a period from when the TX enable signal is turned on to when the DL data slot is started, about once in several minutes.

The DPD signal capture window in the DPD processing unit 42 is not positioned in this period, and the DPD signal capture window is started from a time shifted by $t_{sh}$ (=t2−t1) from the timing t1. Therefore, the DPD processing unit 42 does not set the DPD compensation coefficient based on the DL-CAL signal.

A period from the timing t2 to a timing t3 is a period from the start to the end of the DL data slot. The DPD signal capture window in the DPD processing unit 42 is set to include this period, and the DPD processing unit 42 executes the DPD compensation processing on the communication signal in the DL data slot.

After the DL data slot ends at the timing t3, the control unit of the AAS unit 30 turns off the TX enable signal at a timing t4. As a result, the operation of the transmitter TX in the TRX 51 is stopped.

In the period from the timing t3 to the timing t4, since the DL calibration is not performed, the DL-CAL signal is not output. However, the TRX-BB unit 32 periodically generates and outputs the DPD training signal. Here, in a case where the transmission signal in the period from t2 to t3 is only the SSB, the peak of the DPD training signal is high, and thus, in the DPD processing unit 42, the DPD compensation coefficient based on the DPD training signal is set. On the other hand, in a case where the signal of the maximum rating level is transmitted in the period from t2 to t3, the peak of the signal is higher than that of the DPD training signal, and thus, the DPD compensation coefficient based on the signal of the maximum rating is set.

A period from the timing t4 to a timing t5 is a period in which the operation of the transmitter TX is stopped, and the UL communication of the wireless communication device 10 is performed in this period.

Next, in a period from the timing t5 at which the TX enable signal is turned on to a timing t6 at which the DL data slot is started, the TRX-BB unit 32 generates and outputs the DPD training signal. Here, the DPD signal capture window in the DPD processing unit 42 is positioned in this period, and the DPD processing unit 42 sets the DPD compensation coefficient based on the DPD training signal. The DL calibration is not performed in the period from the timing t4 to the timing t5.

A period from the timing t6 to a timing t7 is a period from the start to the end of the DL data slot, and in this period, the DPD processing unit 42 executes the DPD compensation processing on the communication signal in the DL data slot.

A period from the timing t7 to a timing t8 is a period from when the DL data slot ends to when the TX enable signal is turned off. In this period, the TRX-BB unit 32 generates and outputs the DPD training signal. Here, the DPD signal capture window in the DPD processing unit 42 is positioned in this period, and the DPD processing unit 42 sets the DPD compensation coefficient based on the DPD training signal.

Figure 12:
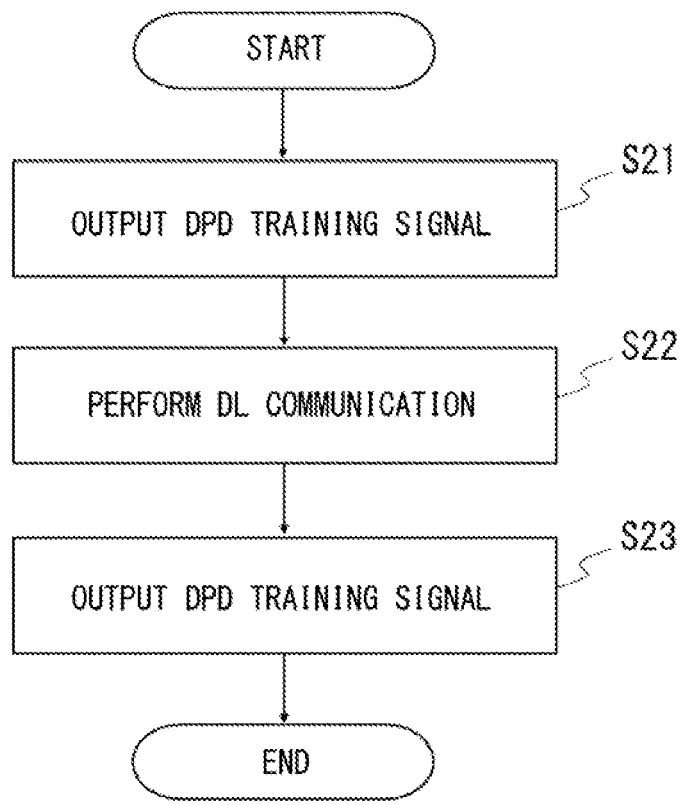
FIG. 12 is a flowchart illustrating an example of processing in the wireless communication device according to the second example embodiment.

FIG. 12 is a flowchart illustrating output of the DPD training signal and signal processing related to the DL communication focusing on before and after one DL data slot. In addition, this example illustrates a case where the DL-CAL signal is not output. Hereinafter, signal processing to be performed will be described.

First, the TRX-BB unit 32 generates and outputs the DPD training signal before the wireless communication device 10 performs the DL communication (step S21). Thereafter, the wireless communication device 10 performs the DL communication (step S22). Thereafter, the TRX-BB unit 32 generates and outputs the DPD training signal again (step S23). The wireless communication device 10 repeats the above processing for each DL data slot to be output. The distortion compensation unit 101 updates the DPD compensation coefficient for the DPD training signal in at least one of step S11 or S13. Therefore, in the DPD processing unit 42, the DPD compensation coefficient based on the DPD training signal is set.

The periods of the timings t1 to t2, the timings t3 to t4, the timings t5 to t6, and the timings t7 to t8 described above are transient periods between ON and OFF of the transmitter TX, and are 10 μs as illustrated in the example of FIG. 4. Then, in this example, since the output time of the DPD training signal is set to 8 μs shorter than 10 μs, the TRX-BB unit 32 can feed back the signal amplified by the transmission amplifier 52 and cause the DPD processing unit 42 to capture the signal.

In addition, the DPD training signal is a broadband and high-density signal. That is, the DPD compensation coefficient determined by the DPD training signal in the DPD processing unit 42 is set in such a way that compensation is performed in any band in the frequency band of the DPD training signal. That is, the DPD processing unit 42 can set a general-purpose DPD compensation coefficient. Therefore, even in a case where a narrowband signal is output in the DL data slot immediately before the DPD training signal and then a broadband signal is output in the next DL data slot, it is possible to suppress deterioration of a gain of the broadband signal in the next DL data slot. In addition, even in a case where a (dense) communication signal having a large number of frequency components is output in the next DL data slot after a (sparse) communication signal having a small number of frequency components is output in the DL data slot immediately before the DPD training signal, it is possible to suppress deterioration of a gain of the communication signal in the next DL data slot.

The DPD training signal may be output before or after each DL data slot instead of before or after each DL data slot. Furthermore, as described above, the DPD training signal is preferably output at a timing that does not overlap with that of the DL-CAL signal. As a result, it is possible to suppress the DPD training signal from affecting the calibration operation to prevent the DL-CAL weight from being calculated inaccurately. In addition, it is also possible to suppress the DPD processing unit 42 from setting the DPD compensation coefficient unsuitable for the broadband signal due to the influence of the DL-CAL signal. Furthermore, the EVM and the ACLR of the transmission amplifier 52 can also be improved.

In addition, the frequency band of the DPD training signal covers the frequency band of the DL-CAL signal, and the DPD training signal is output at a timing before the DL-CAL signal. Therefore, even in a case where the TRX-BB unit 32 outputs the DL-CAL signal, since the general-purpose DPD compensation coefficient is set in advance by the DPD training signal, the wireless communication device 10 can accurately calculate the DL-CAL weight. Therefore, the wireless communication device 10 can accurately compensate for the variation in amplitude and phase.

Furthermore, the wireless communication device 10 includes the TRX 51 between the DPD processing unit 42 and the transmission amplifier 52, and the TRX-BB unit 32 outputs the DPD training signal at the next timing. That is, the timing is at least one of a period in which the transmitter TX of the TRX 51 transitions from off to on before the DL data slot or a period in which the transmitter TX transitions from off to on after the DL data slot. As a result, even in a case where the communication signal in the previous DL data slot is a narrowband signal at a timing at which the signal can be output in the DL direction, the wireless communication device 10 can remove the influence on the DPD compensation coefficient and set the DPD compensation coefficient applicable to the communication signal in the next DL data slot.

Further, the DPD training signal has a peak at the beginning of the signal period. When the DPD processing unit 42 detects this peak, the DPD processing unit 42 can store the entire DPD training signal. Therefore, the DPD processing unit 42 can reliably set an appropriate DPD compensation coefficient.

In addition, in the wireless communication device 10 that performs wireless communication, it is possible to achieve both the calibration operation for determining MU-MIMO performance and the DPD compensation processing suitable for a broadband signal, whereby the quality of wireless communication can be further improved.

Third Example Embodiment

A third example embodiment of the present disclosure is described below with reference to the drawings. In the third example embodiment, a variation of the signal processing described in the second example embodiment will be described.

The antennas 34 #0 to 34 #31 of the wireless communication device 10 described above can transmit a wireless signal by fan beamforming and transmit a wireless signal by data beamforming, for example. Here, transmitting a wireless signal by fan beamforming means transmitting a wireless signal having a substantially constant intensity in a range of a predetermined angle between the front side of the wireless communication device 10 and a horizontal direction from the front surface, and is used for broadcast data transmission, for example. On the other hand, transmitting a wireless signal by data beamforming means transmitting a wireless signal having a high intensity to the front side of the wireless communication device 10 or a point in a certain angular direction in the horizontal direction and transmitting a wireless signal having a low intensity to a null point which is another point in the horizontal direction. This wireless signal transmission method is used for data communication with respect to a specific UE. The antennas 34 are arranged in one or a plurality of columns (for example, four columns).

Furthermore, even in a case where the DPD compensation coefficient is set by the DPD training signal, the wireless communication device 10 transmits a wireless signal based on the DPD training signal from the antennas 34 #0 to 34 #31.However, since the wireless signal based on the DPD training signal is not a communication signal, it is not originally a signal to be transmitted to the UE. Therefore, it is preferable to suppress the power of the wireless signal transmitted based on the DPD training signal as much as possible. In particular, it is preferable to reduce the power of the wireless signal transmitted based on the DPD training signal in a front side direction of the wireless communication device 10 (a direction in which data communication with the UE is particularly assumed). As a result, it is possible to prevent the UE in a cell configured by the wireless communication device 10 from receiving an unnecessary signal.

Specifically, the TRX-BB unit 32 generates the DPD training signal in each signal channel in such a way that phases of wireless signals in adjacent antennas 34 (that is, adjacent signal channels) are different.

Figure 13:
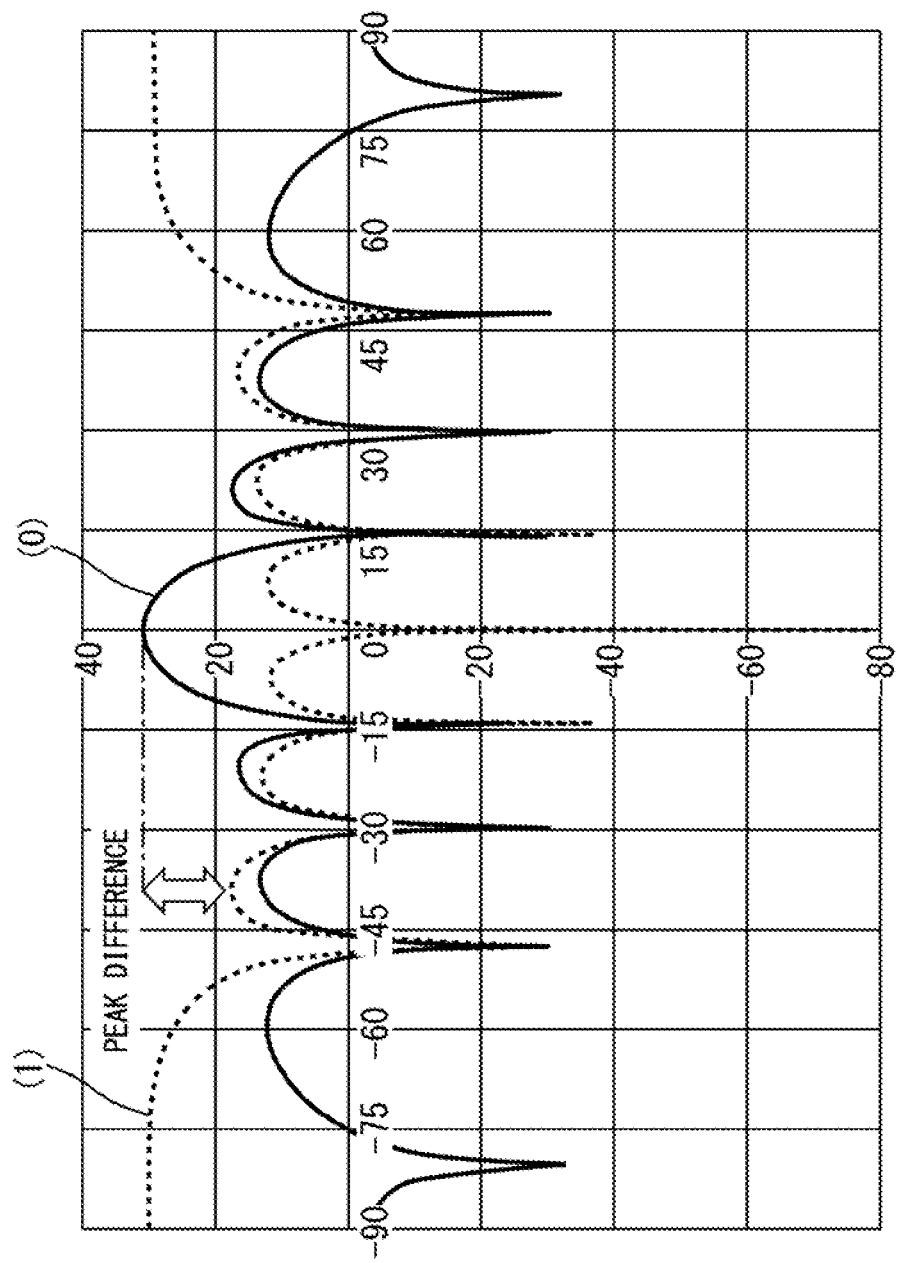
FIG. 13 is a graph illustrating an example of a pattern of transmission power according to a third example embodiment.

FIG. 13 is a graph illustrating an example of a pattern of a gain of transmission power in the wireless communication device 10. The horizontal axis of the graph of FIG. 13 represents the angle in the horizontal direction from the front side of the wireless communication device 10, and the vertical axis of the graph of FIG. 13 represents the power (dB) of the wireless signal output from the wireless communication device 10 when reference power is 0 dB. Furthermore, (0) of FIG. 13 is a pattern in a case where all the antennas 34 #0 to 34 #31 output the DPD training signals as the beamforming signals in the same phase. On the other hand, (1) is a pattern in a case where the antenna 34 outputs the DPD training signal as the beamforming signal in such a way that the phase of the DPD training signal in an adjacent signal channel is inverted (that is, the phase changes by 180°).

As illustrated in FIG. 13, in the pattern (1), the transmission power in the front side direction (near 0°) decreases by about 30 dB as compared with the pattern (0). Further, the peak power of (1) within a range of 45° in a left-right direction from the front side is lower than the peak power of (0) in the front side direction by 10 dB or more. Therefore, it is possible to prevent the UE in the cell configured by the wireless communication device 10 from receiving an unnecessary signal based on the DPD training signal.

As processing for achieving this effect, it is also conceivable that the TRX-BB unit 32 outputs data of the DPD training signal having no correlation for each signal channel. However, as described above, when the phase of the DPD training signal is set to be different between adjacent antennas 34, the storage capacity of the wireless communication device 10 necessary for generating the DPD training signal can be reduced.

In the wireless communication device 10, the number of antennas 34 is not limited to the illustrated number (32). In the wireless communication device 10, if the DPD training signal is output in such a way that the phases of adjacent antennas are different from each other, the above-described effect can be achieved.

Note that the present disclosure is not limited to the above example embodiments, and can be appropriately changed without departing from the gist. For example, the number of channel signals in the second and third example embodiments is not limited to 32. Furthermore, in the second example embodiment, the communication signal is not limited to the SSB, and may be another signal.

In addition, if there is a circuit configuration in which the DPD processing unit is provided upstream of the reception amplifier 55, it is possible to achieve both the DPD compensation processing and the UL calibration by executing processing similar to that in the second example embodiment for the UL calibration instead of the DL calibration.

The wireless communication method to which the technology of the present disclosure can be applied is not limited to those described in the second and third example embodiments.

In the example embodiments described above, the disclosure has been described as a hardware configuration, but the disclosure is not limited thereto. The processing (steps) in the device described in the above-described example embodiments of the disclosure can also be implemented by causing a processor in a computer to execute a computer program.

Figure 14:
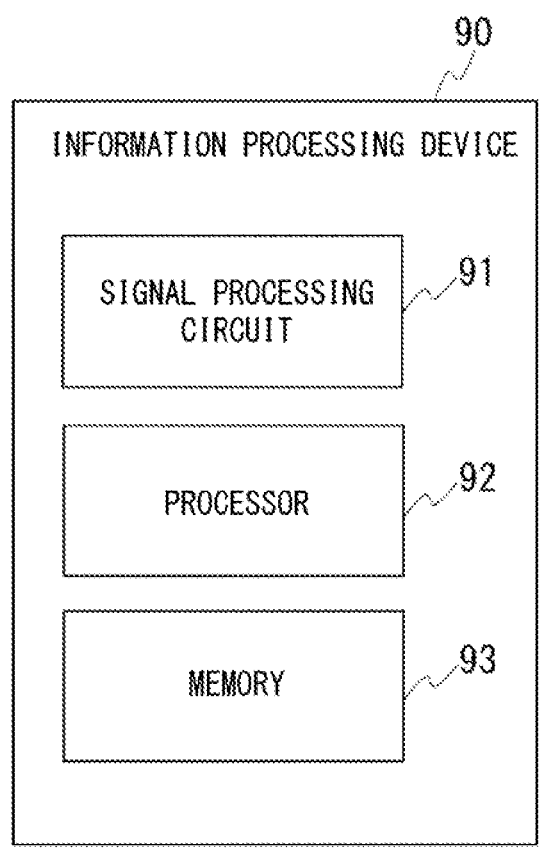
FIG. 14 is a block diagram illustrating an example of a hardware configuration of the device according to each example embodiment.

FIG. 14 is a block diagram illustrating a hardware configuration example of an information processing device (signal processing device) in which the processing of each example embodiment described above is executed. Referring to FIG. 14, an information processing device 90 includes a signal processing circuit 91, a processor 92, and a memory 93.

The signal processing circuit 91 is a circuit for processing a signal under the control of the processor 92. The signal processing circuit 91 may include a communication circuit that receives a signal from a transmission device.

The processor 92 reads and executes software (computer program) from the memory 93 to execute the processing in the device described in the above-described example embodiments. As an example of the processor 92, one of a central processing unit (CPU), a micro processing unit (MPU), a field-programmable gate array (FPGA), a demand-side platform (DSP), or an application specific integrated circuit (ASIC) may be used, or more than one of these may be used in parallel.

The memory 93 is implemented by a combination of a volatile memory and a nonvolatile memory. The memory 93 may include a storage disposed away from the processor 92. In this case, the processor 92 may access the memory 93 through an input/output (I/O) interface (not illustrated).

In the example of FIG. 14, the memory 93 is used to store a software module group. The processor 92 can execute the processing described in the above-described example embodiments by reading and executing these software module groups from the memory 93.

As described above, one or a plurality of processors included in each device in the above-described example embodiments executes one or a plurality of programs including a command group for causing a computer to perform the algorithm described with reference to the drawings. With this processing, the signal processing method described in each example embodiment can be implemented.

The program can be stored using various types of non-transitory computer readable media to be supplied to a computer. The non-transitory computer readable media include various types of tangible storage media. Examples of the non-transitory computer readable medium include a magnetic recording medium (for example, a flexible disk, a magnetic tape, or a hard disk drive), an optical magnetic recording medium (for example, a magneto-optical disk), a CD-ROM (read only memory), a CD-R, a CD-R/W, and a semiconductor memory such as a mask ROM, a programmable ROM (PROM), an erasable PROM (EPROM), a flash ROM, or a random access memory (RAM). In addition, the program may be supplied to the computer by various types of transitory computer readable media. Examples of the transitory computer readable media include electric signals, optical signals, and electromagnetic waves. The transitory computer readable medium can supply the program to the computer via a wired communication path such as an electric wire and an optical fiber, or a wireless communication path.

Although the present disclosure has been described above with reference to the example embodiments, the present disclosure is not limited to the above. Various modifications that could be understood by those skilled in the art can be made to the configuration and details of the present disclosure within the scope of the disclosure.

This application claims priority based on Japanese Patent Application No. 2020-217508 filed on Dec. 25, 2020, the disclosure of which is incorporated herein in its entirety.

REFERENCE SIGNS LIST

10 WIRELESS COMMUNICATION DEVICE
20 BF-BB UNIT
30 AAS UNIT
31 OPTICAL TRANSCEIVER
32 TRX-BB UNIT
33 FRONTEND UNIT
34 ANTENNA
35 DISTRIBUTOR/COMBINER
36 SW
37 CAL-TRX
40 BB UNIT
41 CFR PROCESSING UNIT
42 DPD PROCESSING UNIT
50 FE UNIT
51 TRX
52 TRANSMISSION AMPLIFIER
53 DIRECTIONAL COUPLER
54 SW
55 RECEPTION AMPLIFIER
100 SIGNAL PROCESSING DEVICE
101 DISTORTION COMPENSATION UNIT
102 AMPLIFIER
103 SIGNAL OUTPUT UNIT

What is claimed is:

1. A signal processing device comprising:
a distortion compensation circuit configured to execute distortion compensation processing of compensating for nonlinear distortion on an input signal, and output a signal subjected to the distortion compensation processing;
an amplifier configured to amplify the signal output from the distortion compensation circuit and output the amplified signal as a communication signal for communication; and
a signal output circuit configured to output an adjustment signal for adjusting the distortion compensation processing to the distortion compensation circuit as the input signal at a timing at which the communication signal is not output, the adjustment signal having a frequency band that covers a frequency band of the communication signal.

2. The signal processing device according to claim 1, wherein the signal output circuit outputs, as the adjustment signal, a signal modulated by orthogonal frequency division multiplexing (OFDM) or spread spectrum.

3. The signal processing device according to claim 1, wherein the signal output circuit outputs the adjustment signal at a timing that does not overlap with that of a calibration signal output during a calibration operation of the signal processing device.

4. The signal processing device according to claim 3, wherein
the frequency band of the adjustment signal covers a frequency band of the calibration signal, and
the adjustment signal is output at a timing before the calibration signal.

5. The signal processing device according to claim 1, further comprising a transmitter between the distortion compensation circuit and the amplifier,
wherein the signal output circuit outputs the adjustment signal in at least one of a period in which the transmitter transitions from off to on before a data slot of the communication signal or a period in which the transmitter transitions from on to off after the data slot of the communication signal.

6. The signal processing device according to claim 1, wherein the signal output circuit outputs, as the adjustment signal, a signal having a signal peak at a beginning of a signal period.

7. The signal processing device according to claim 1, wherein the signal processing device is a wireless communication device further comprising wireless transmission circuit for wirelessly transmitting an output signal from the amplifier.

8. The signal processing device according to claim 7, wherein
the signal processing device comprises a plurality of the amplifiers, the wireless transmission circuit includes a plurality of antennas corresponding to the plurality of amplifiers, and the plurality of antennas wirelessly transmit the adjustment signals in such a way that a phase is different between adjacent antennas.

9. A signal processing method comprising:

executing, by a distortion compensation circuit, distortion compensation processing of compensating for nonlinear distortion on an input signal, and outputting a signal subjected to the distortion compensation processing;

amplifying the signal output from the distortion compensation circuit and outputting the amplified signal as a communication signal for communication; and outputting an adjustment signal for adjusting the distortion compensation processing to the distortion compensation circuit as the input signal at a timing at which the communication signal is not output, the adjustment signal having a frequency band that covers a frequency band of the communication signal.

10. A non-transitory computer readable medium storing a program for causing a computer to perform:

executing, by a distortion compensation circuit, distortion compensation processing of compensating for nonlinear distortion on an input signal, and outputting a signal subjected to the distortion compensation processing;

amplifying the signal output from the distortion compensation circuit and outputting the amplified signal as a communication signal for communication; and outputting an adjustment signal for adjusting the distortion compensation processing to the distortion compensation circuit as the input signal at a timing at which the communication signal is not output, the adjustment signal having a frequency band that covers a frequency band of the communication signal.

* * * * *